US008046306B2

(12) United States Patent
Stinson

(10) Patent No.: US 8,046,306 B2
(45) Date of Patent: Oct. 25, 2011

(54) SYSTEM, METHOD, AND APPARATUS FOR PROPERTY APPRAISALS

(75) Inventor: Bradley Hugh Stinson, Calgary (CA)

(73) Assignee: Zaio Corporation (CA)

( * ) Notice: Subject to any disclaimer, the term of this patent is extended or adjusted under 35 U.S.C. 154(b) by 0 days.

(21) Appl. No.: 12/147,193

(22) Filed: Jun. 26, 2008

(65) Prior Publication Data

US 2009/0006185 A1    Jan. 1, 2009

Related U.S. Application Data

(60) Provisional application No. 60/947,163, filed on Jun. 29, 2007.

(51) Int. Cl.
*G06Q 50/00* (2006.01)

(52) U.S. Cl. ........................................... 705/313

(58) Field of Classification Search ................. 705/1
See application file for complete search history.

(56) References Cited

U.S. PATENT DOCUMENTS

| | | |
|---|---|---|
| 2004/0030631 A1 | 2/2004 | Brown et al. |
| 2005/0154656 A1 | 7/2005 | Kim et al. |
| 2005/0154657 A1 | 7/2005 | Kim et al. |
| 2005/0216292 A1 | 9/2005 | Ashlock |
| 2007/0095887 A1* | 5/2007 | Barbosa et al. ............... 235/375 |
| 2008/0147519 A1* | 6/2008 | Reigel ........................... 705/28 |

OTHER PUBLICATIONS

The Internet Wayback Machine (www.archive.org) has archived files of www.zaio.com dating more than one year prior to applicant's effective filing date of Jun. 29, 2007. See www.zaio.com, retrieved from Internet Wayback Machine (www.archive.org), date range: Jun. 2004-Feb. 2005-Mar. 2005 (hereinafter Zaio).*
Zaio Announces Achievement of Company Milestones. (Jun. 8, 2007). Canada NewsWire,1.*
Kirstin Finneran. (Jun. 17, 2007). Carpentersville homes part of new Web site :[F1,F2,McHenry Edition]. Daily Herald,p. 1. (hereinafter Finneran).*
Lenders Now Using Zaio's Innovative Valuation Solution. (Feb. 13, 2007). Canada NewsWire,1. (hereinafter handheld).*
Marty Hope. (Mar. 18, 2006). Quite a picture: :[Final Edition]. Calgary Herald,p. J1 Front. (hereinafter Hope).*

* cited by examiner

*Primary Examiner* — Arthur Duran
*Assistant Examiner* — Matthew T Sittner
(74) *Attorney, Agent, or Firm* — Tiffany & Bosco

(57) ABSTRACT

An appraisal system, method, and apparatus for property appraisals including a collector system, an appraisal database, an accounting system, and a scoring system. The collector system gathers data associated with a property and provides the data to the appraisal database. The collector system also reviews, edits, corrects, validates, and formats the data. The scoring system uses the collector system and appraisal database to access and analyze the data to calculate a score associated with the property. The score is calculated using one or more of a zone and market group associated with the property. The scoring system maps the score to one or more comparable sales of one or more other properties based on one or more of the zone and market group in order to generate an appraisal report for the property.

20 Claims, 17 Drawing Sheets

SYSTEM, METHOD, AND APPARATUS FOR PROPERTY APPRAISALS

RELATED APPLICATIONS AND CLAIM OF PRIORITY

This patent application claims priority to, and incorporates by reference, U.S. provisional patent application 60/947,163, titled: System, Method, and Apparatus for Property Appraisals, which was filed on Jun. 29, 2007.

FIELD OF INVENTION

The present invention generally relates to property appraisals, and more particularly, to a system and method for quickly and accurately appraising one or more pieces of property in connection with valuation and appraisal of the property.

BACKGROUND

Property appraisals are a way to value a particular piece of real property during buying, selling, taxation, or exchanges of property. Appraisals are used during each of these processes and also during mortgage and lending transactions.

Property appraisals can be cumbersome, time-consuming, and inaccurate. Property appraisers typically appraise one property at a time, rather than multiple properties. A property appraisal may take 5-10 days, because an appraiser usually visits the property personally to measure its value. Alternatively, the property may not be physically inspected, which can make the appraisal inaccurate. Property values vary based on supply and demand as well as physical characteristics such as size, amenities, parking, view, and condition. As such, value has typically been measured by an appraiser's individual opinion after conducting, property specific research. Research time delays the customer's buying or selling process. Also, the opinion of an individual appraiser can be influenced by those involved in fraudulent financing schemes. Attempts have been made to deal with the long delay in receiving an appraisal using AVMs (Automated Valuation Models) and BPOs (Broker Price Opinions). While these tools do shorten the lag between the appraisal request and appraisal delivery, accuracy is compromised in both cases. It is rare that these appraisals include a visual inspection or photograph on the property in question. The lack of a photograph as well as lender pressure can substantially increase the possibly of fraud, which GSEs (Government Sponsored Entities) such as Freddie Mac™ and Fannie Mae™ are most concerned with when guaranteeing loans. It could be that as many as one-third of AVMs and BPOs are not used due to inaccurate values. Automated. Valuation Models (AVMs) have attempted to Value individual properties through pure statistical analysis or by updating the last selling price based on a time index. Property appraisals typically only include recent, sales, so that a complete analysis of all sales is not considered during the valuation of property value. To avoid another savings and loan crisis, the United States Government may pressure lenders to revalue each mortgage where collateral is perceived to have fallen. Also, the closing period on residential properties in the United States has traditionally taken 60-120 days; however, there is growing acceptance of a 1-5 day closing period. This trend highlights the desire for appraisals to be delivered on very short notice without compromising accuracy.

It is desirable to analyze all sales to measure a property's value, rather than only the recent sales (e.g., three or four of the highest priced or most recent sales). It would be desirable to have an appraisal system that accurately reflects individual property differences and monitors the ever changing value of each property in advance of a particular transaction. By recording property differences and measuring value in advance of a transaction, the appraiser can work without pressure to meet a particular value estimate and the client requiring an appraisal does riot have to wait for the research.

SUMMARY

Exemplary embodiments of the present invention include a system, method, and apparatus for property appraisals such as:

An appraisal system includes: a collector system configured to gather at least one of data and files associated with a property; and a scoring system coupled to the collector system and configured to analyze at least one of the data and files in order to calculate a score associated with the property, where the score is calculated using at least one of a zone and a market group associated with the property.

The appraisal system further includes an appraisal database coupled to at least one of the collector system and the scoring system and configured to receive at least one of data and files from at least one of the collector system and the scoring system in order to generate an appraisal report associated with the property.

The appraisal system further includes where the scoring system, uses at least one of the score and market analysis software to calculate an appraisal report associated with the property.

The appraisal system further includes where the scoring system uses at least, one of the score and market analysis software to calculate an appraisal value associated with the property.

The appraisal system where the scoring system uses at least one of the score and market analysis software to calculate at least one of an appraisal value and an appraisal report associated with the property.

The appraisal system where at least one of: a portable communication device in communication with at least one of the collector system and the scoring system collects latitude, longitude, and altitude coordinates of the property via a Global Positioning System; and a portable communication device in communication with at least one of the collector system and the scoring system generates at least one of a photograph and satellite image of the property via a Global Positioning System in order to place a verified latitude, longitude, and altitude in the center of the property.

The appraisal system where at least one of: the data and files include at least one of a photograph of the property, a parcel number associated with the property, and one of more comparable sales of other properties, in the market group of the property; the data includes at least one of geographic area, type, style, and size range of the property; and a portable communication device configured to capture an image of the property and record audibly an address for the property to generate an audio clip that is associated with the image, so that the image can be tagged with a related address data field.

The appraisal system further includes where the data and files include at least one Of a photograph of the property, a parcel number associated with the property, and one or more comparable sales of other properties in the market group of the property.

The appraisal system further includes where the data includes at least one of geographic area, type, style, and size range of the property.

The appraisal system further includes where the zone is defined by at least one of the market group, a community, a neighborhood, a city, one Or more zip codes, a county, a state, a region, and a country.

The appraisal system further includes where the market group is defined by at least one of the zone, one or more attributes of the property, one or more comparable sales of other properties, a subdivisions a community, and a predetermined geographic boundary.

The appraisal system further includes where one or more properties with similar attributes are in the same market group.

The appraisal system where at least one of: the market group is defined by at least one of the zone, one or more attributes of the property, one or more comparable sales of other properties, a subdivision, a community, and a predetermined geographic boundary; and one or more properties with similar attributes are in the same market group.

The appraisal system further includes where at least one of: the data is at least one of gathered, reviewed, validated, edited, corrected, and formatted in order to be able to generate an appraisal report associated with the property; and a portable communication device in communication with at least one of the collector system and the scoring system collects latitude and longitude coordinates of the property via a Global Positioning System.

A method including the steps of: collecting data related to a first property; creating at least one of a zone and a market group for the first property; generating a score associated with the first property based on the data; mapping the score to one or more comparable sales of one or more other properties based on at least one of the score, the zone, and the market group; and generating an appraisal report for the first property based on at least one of the score, the zone, the market group, and mapping of the score to one or more comparable sales of one or more other properties.

The method further comprising collecting the data in at least one of text; image, audio, and video files.

The method further comprising at least one of: one or more of the files are imported into an appraisal database; address data fields associated with the files are tagged in the appraisal database; integrating the files into the appraisal database; and allowing access to the files in the appraisal database in order to generate an appraisal report.

The method further comprising at least one of: performing quality control of the data; notifying an appraiser or another entity if there is a quality control error associated with the data; at least one of formatting and validating the data; updating an appraisal value of the first property on a timely basis including at least one of daily, monthly, quarterly, and annually; and allowing access to the data in the appraisal database in order to generate an appraisal report.

A method including the steps of: requesting an appraisal of a property via an appraisal system, where the appraisal system includes a collector system, an appraisal database, an accounting system, and a scoring system; using the collector system to search for at least one of data and files related to the property; searching the appraisal database for at least one of data and files related to the property; creating an accounting invoice related to the property via the accounting system; analyzing at least one of the data, files, and accounting invoice via the scoring system to generate at least one of a score, a zone, and a market group; and preparing an appraisal report associated with the property instantly or within a predetermined period of time based on at least one of the score, the zone, and the market group.

The method further comprising at least one of: where the appraisal report includes at least one of an exterior based appraisal, an interior based appraisal, and a special request appraisal; and notifying an appraiser to perform a property or site inspection of the property based on the appraisal report.

The method further comprising at least one of: accessing the collector system to at least one of add, edit, review, and verify data including photographs associated with the property; at least one of viewing, reviewing, adding, editing, and verifying property data including photographs via a portable communication device; and accessing the collector system to at least one of add, edit, review, and verify the appraisal report associated with the property.

A method including the steps of: collecting data related to a first property; creating at least one of a zone and a market group for the first property based on the data, where each zone includes a plurality of market groups and each market group is generated based on at least one of geographic area, type, style, and size range of the first property; generating a score associated with the first property based on at least one of the zone and market, group; mapping the score to one or more comparable sales of one or more other properties based on at least one of the score, the zone, and the market group; and generating an appraisal report for the first property based on at least one of the score, the zone, the market group, and mapping of the score to one or more comparable sales of one or more other properties.

The method further comprising mapping the score to one or more comparable sales of one or more other properties includes mapping the score to a cash value of one or more other properties based on at least one of the score, the zone, and the market group.

The method further comprising mapping the score to one or more comparable sales of one or more other properties includes mapping the score to a current, market value of one or more other properties based on at least one of the score, the zone, and the market group.

A system, including: a host system including a processor for processing data associated with a property; a memory in communication with the processor for storing the data; an input digitizer in communication with the memory and the processor for inputting the data into the memory; and an application program stored in the memory and accessible by the processor for directing processing of the data by the processor, where the application program, is configured to facilitate the steps of: collecting data related to a first property; creating at least one of a zone and a market group for the first property; generating a score associated with the first property based on the data; mapping the score to one or more comparable sales of one or more other properties based on at least one of the score, the zone, and the market group; and generating an appraisal report for the first property based on at least one of the score, the zone, the market group, and mapping of the score to one or more comparable sales; of one or more other properties.

A system, including: a host server for accepting and processing data in connection with a property; an appraisal database in communication with the host server for collecting data on the property and using a collector system of the host server to gather at least one of data and files associated with the property; and a scoring system in communication with at least one of the host server, the collector system, and the appraisal database configured to analyze at least one of the data and files in order to calculate a score associated with the property, where the score is calculated using at least one of a zone and a market group associated with the property.

A system, including: a browser for submitting data to a web server, where the browser and the web server communicate via a communication channel and the data submitted to the web server includes information in connection with at least a first property; a collector system associated with the web server for collecting data related to the first, property; an appraisal database associated with the web server and in communication with the collector system for collecting data on the first property; and a scoring system associated with the web server and in communication with at least one of the collector system and the appraisal database for creating at least one of a zone and a market group for the first property, generating a score associated with the first property based on the data, mapping the score to one or more comparable sales of one or more other properties based on at least one of the score, the zone, and the market group, and generating an appraisal report for the first property based on at least one of the score, the zone, the market group, and mapping of the score to one or more comparable sales of one or more other properties.

BRIEF DESCRIPTION OF THE DRAWINGS

Exemplary embodiments of the present invention are described in the context of the appended drawing figures, where like numerals designate like elements.

DETAILED DESCRIPTION

Figure 1:
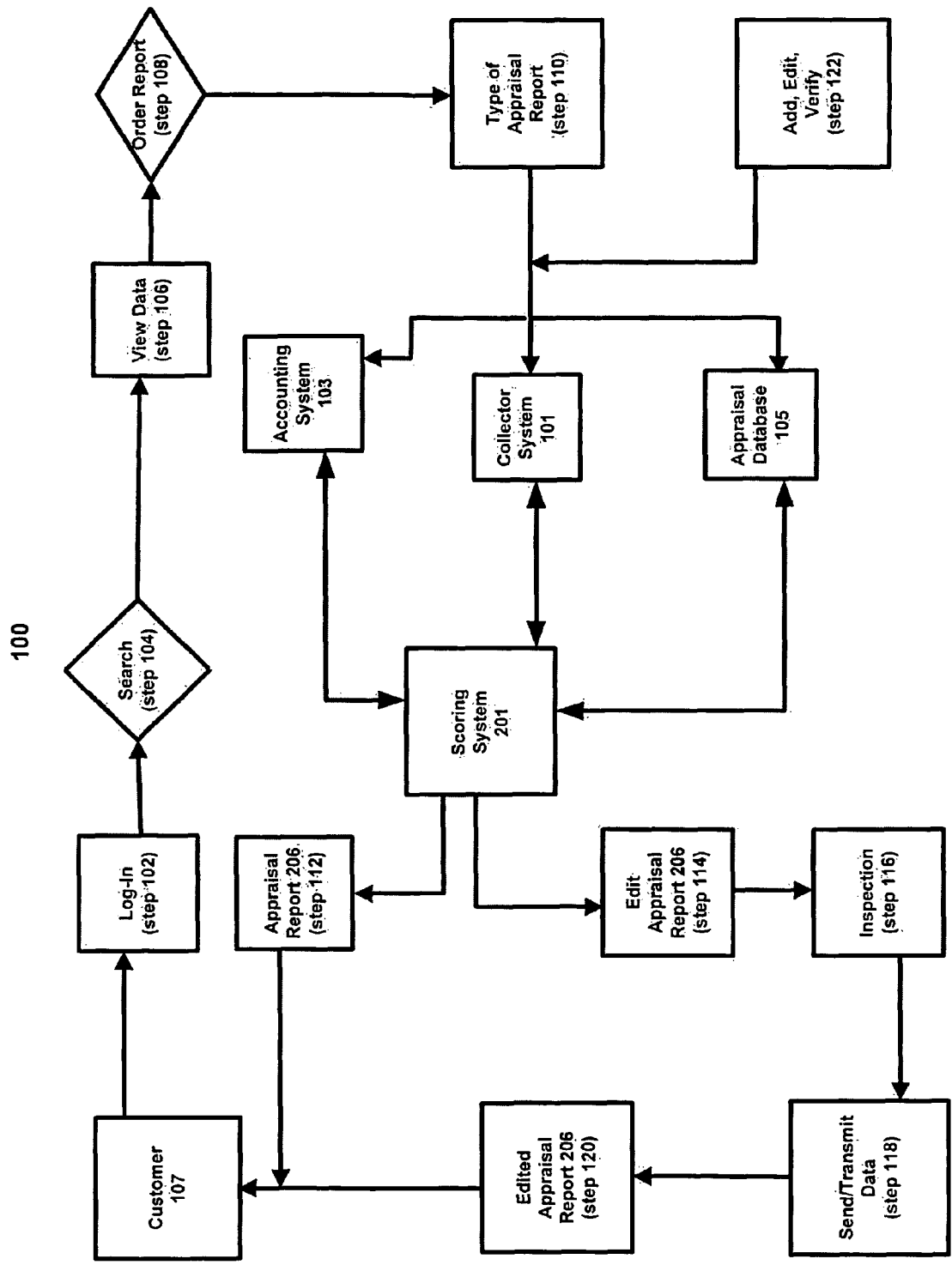
FIG. 1 illustrates an appraisal system in accordance with an exemplary embodiment of the present invention.

The present invention of property appraisals incorporates physical inspection, timely analysis, and accurate appraising of properties. A property appraisal system 100 of FIG. 1 includes a collector system 101, an accounting system 103 (e.g., an accounting database), an appraisal database 105, and a scoring system 201 (in FIG. 2) in accordance with an exemplary embodiment of the present invention. Customer(s) 107 such as individuals, banks, insurance, companies, and other entities can order residential and commercial real estate appraisals over the internet using appraisal system 100. Home ownership has significantly increased and as a result, the total volume of residential mortgages has significantly increased. This increase has produced a large pool of mortgage backed portfolios that banks buy and sell regularly (depending on risk exposures). Appraisal system 100 can be a one-stop shop for lenders requiring thousands of appraisals. A lender can subscribe to use appraisal system 100 for a predetermined period of time (e.g., the life of a mortgage), where changes in value of a property based on an appraisal can affect the value of the equity in the property (e.g., on a daily, monthly, quarterly, annual basis, or any other period of time). Appraisal system 100 can offer accurate and timely appraisal information without lenders calling on multiple appraisers in different regions. For example, consider a lender receiving a credit, report for a fee from providers such as EQUIFAX™ or TransUnion™. Appraisal system 100 offers substantial efficiencies and economies of scale. Appraisal system 100 can generate appraisals for lenders and banks such as WELLS FARGO™, Citigroup™, WACHOVIA™, and Countrywide Financial™. These entities frequently reassess and trade large mortgage-backed debt securities for which they desire fast and accurate valuations. As the number of real estate, transactions and inquiries grow, so does the desire that lenders, among other groups, receive accurate and up-to-date appraisal information quickly (e.g., instantaneously or up to 48 hours). Appraisers visit the property, collect data (e.g., common data), and complete an appraisal report 206. Appraisal system 100 consolidates existing common data and substantially ensures its accuracy as soon as new neighborhood data is available (e.g., providing an appraisal instantaneously or within 24-48 hours). Appraisal system 100 can shorten the time it takes to generate a USPAP (Uniform Standards of Professional Appraisal Practice) compliant appraisal from five-ten days to instantly or within seconds (or up to 48 hours depending on the detail desired). For example, appraisal system 100 can be used to appraise every home or property, on every street, one house or property at a: time in entire cities including compliance with USPAP standards 1 and 2 (e.g., substantially faster and more accurately than a tax assessor could do). Appraisal system 100 can also update the value of each property on a timely basis (e.g., daily, weekly, monthly, quarterly, or annually).

Appraisal system 100 can improve accuracy of the appraisal to over 90% (compared to 65% from the next best alternative). Alternatively, appraisal system 100 can also be used with an order management system (e.g., Realink™ system) to give customer 107 a choice between an instant appraisal via appraisal system 100 or an appraisal delivered in the traditional way (e.g., over five-ten days). This flexibility allows appraisal system 100 access to lenders such as Fannie Mae™, WELLS FARGO™, and WACHOVIA™, all of whom use a network of 4,000 appraisers from time to time (e.g., via the Realink™ system or another order management system).

Figure 2:
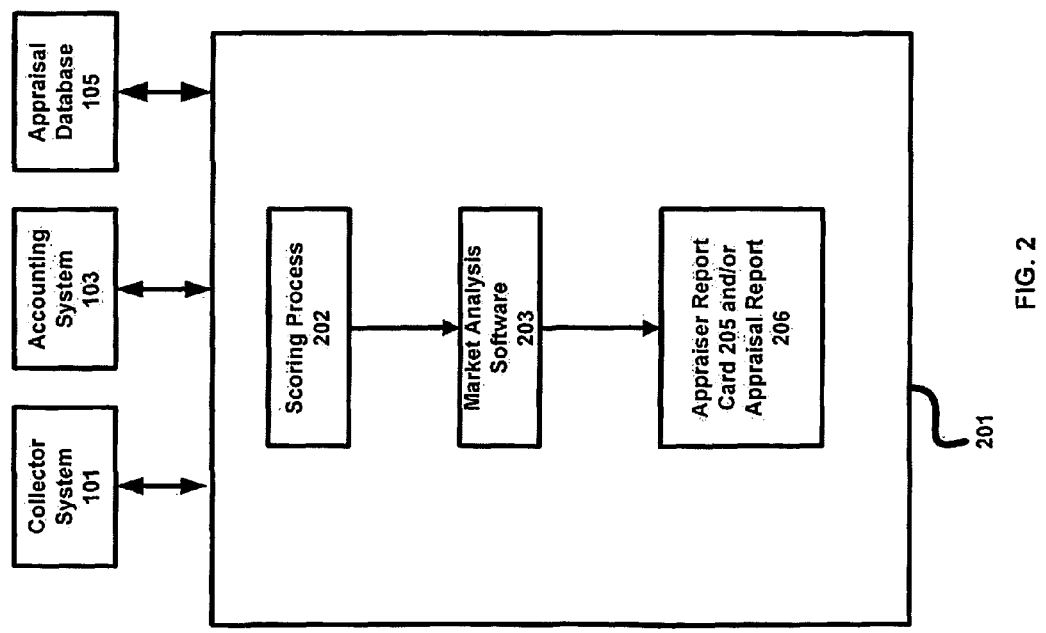
FIG. 2 illustrates an appraisal system with a scoring system in accordance with an exemplary embodiment of the present invention.
Figure 6:
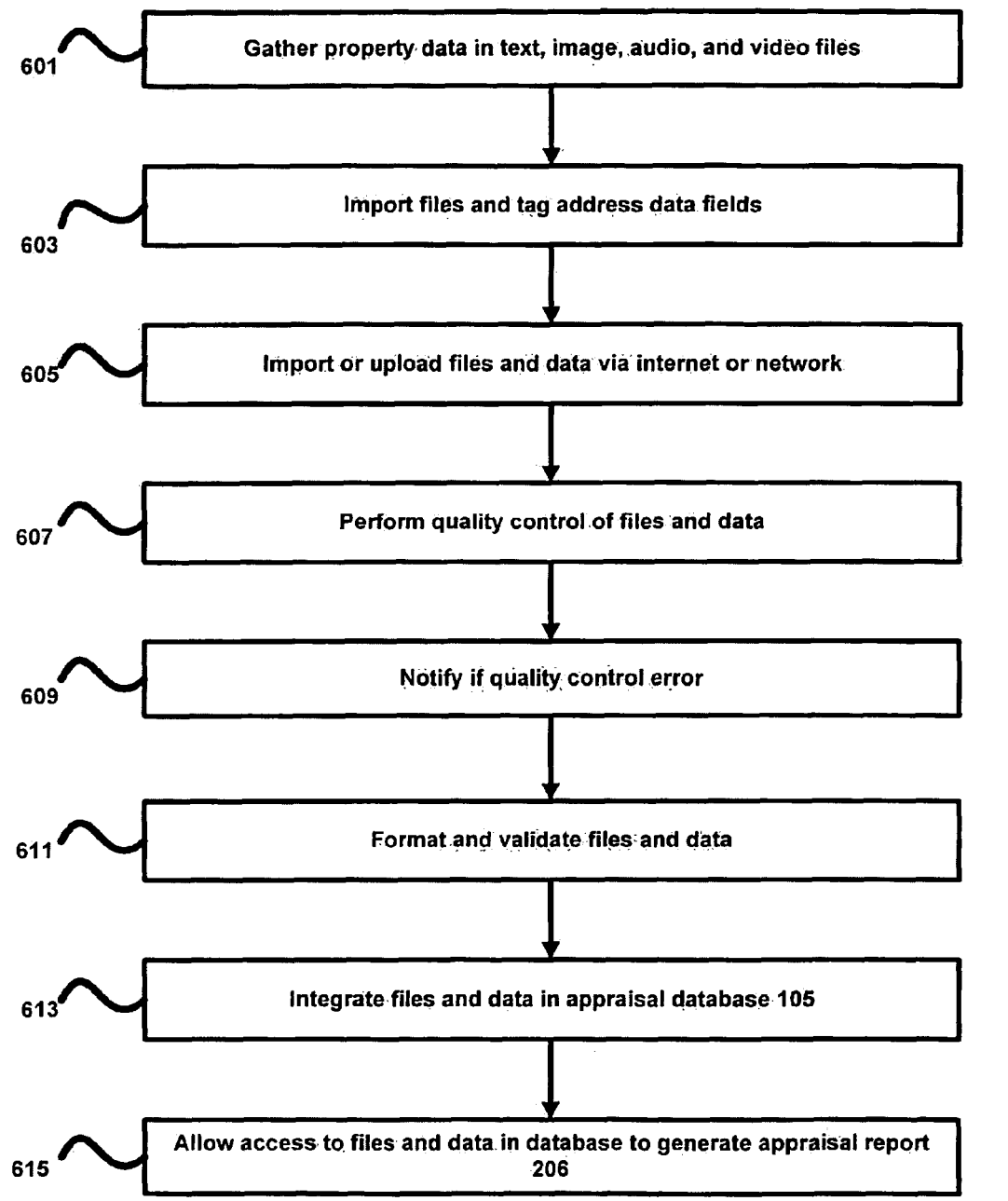
FIG. 6 is a flowchart illustrating a method for creating appraisal database 105 in accordance with an exemplary embodiment of the present invention.

With reference to FIGS. 1, 2, and 6, property data is gathered, validated, edited or corrected, and formatted in order to be able to generate an appraisal report 206. Property data is gathered in text, image) audio, and video files (step 601). A trained professional (e.g., appraiser, photographer, videographer, or other) photographs (via a digital camera or video recorder) and prepares audio files about various pieces of property within a predetermined area. The appraiser, photographer, videographer, or other trained professional can be the same person of entity or separate. The photographer walks the street and carefully frames each photograph to view the most important aspects of the home, building, or other real estate. For example, a trained photographer moves through a zone (e.g., an area defined by a zip code) using a digital camera with voice recording capabilities and captures pictures of properties plus audio or sound files with the associated address of the property. The photographer can photograph each property randomly by recording audibly the addresses for each photograph in the zone. Typically, after taking the photograph, the photographer speaks the address of the property audibly into the camera's audio record function, which creates an audio clip that is associated with that particular photo image. The photographer can hear sound files while tagging the digital pictures with related address data fields. Files are imported into appraisal system 100 and address data fields are tagged (e.g., via the Internet or any network) (steps 603 and 605). For example, a photographer can send the data from the field (street) to collector system 101 using, a Microsoft file (e.g., Access DB (or database)) or MYSQL (software). By using digital photography and state-of-the-art technology, collector software within collector system 101 imports and organizes the photographs and audio clips generated by a photographer in the geographic area. These files can include satellite photos and one or more maps, which permits accurate recording of GPS (Global Positioning System) coordinates (e.g., by clicking on a roof-top within the satellite photo). Digital photograph and sound files (to record the address) of each property are compiled into, the collector system 101. Collector system 101 allows a user (e.g., an appraiser) to import text, image, audio, and video files via the Internet or any network.

Collector system 101 generates a database (e.g., GeoPic™ collector database 121) with the photograph of each property (and can include the text, image, audio or sound, and video files). This GeoPic™ collector database 121 of images and valuations can be used for the real estate, mortgage, and insurance industries, among others, grows over time with additional property information, and is updated constantly to maintain accuracy. Collector system 101 generates a central visual database (e.g., a comprehensive real estate photo library) from the GeoPic™ collector database 121 that allows users to view properties at the street level from their computer (e.g., where each property can be accessed by address). Photographers take pictures of all residential, commercial, and industrial properties within defined geographic areas (e.g., zones). Images from these zones are compiled into a central visual database (e.g., a GeoPic™ collector database 121) within collector system 101. The GeoPic™ collector database 121 is a visual database of residential, industrial and commercial properties in major cities across the United States (or any other country, state, region, or area). Using the GeoPic™ collector database 121 cuts costs and improves efficiencies for appraisers using appraisal system 100 who traditionally have had to proceed with this often arduous process on their own. Collector system 101 offers the real estate market an affordable and efficient alternative to traditional property evaluation methods. The central visual database within collector system 101 reduces and often eliminates the "picture taking" time and expense currently experienced by appraisers, real estate agents, and others who require visual images of property. The central visual database allows qualified users access to an enormous property inventory and information instantly or within seconds. The central visual database can also include a Visual Yellow Pages (VYP) (e.g., where appraisal system 100 partners with Yellow Pages™ directories and online mapping sites such as Google™, YAHOO!™, and MAPQUEST™). As such, local businesses can post interior pictures of their stores and operations via such online directories, so that appraisers and customer(s) 107s can have access to more detailed information. Such a central visual database can be used in various other industries including police department, fire department, ambulance, city planning; city engineering, business planning, business management, retail location studies, construction bids and quotes, marketing of home improvement materials, marketing of retail business service (such as interior virtual tours of retail shops and services that link; to the exterior photo), and GPS (Global Positioning System) navigation systems (e.g., showing a photo of the destination).

Figure 14:
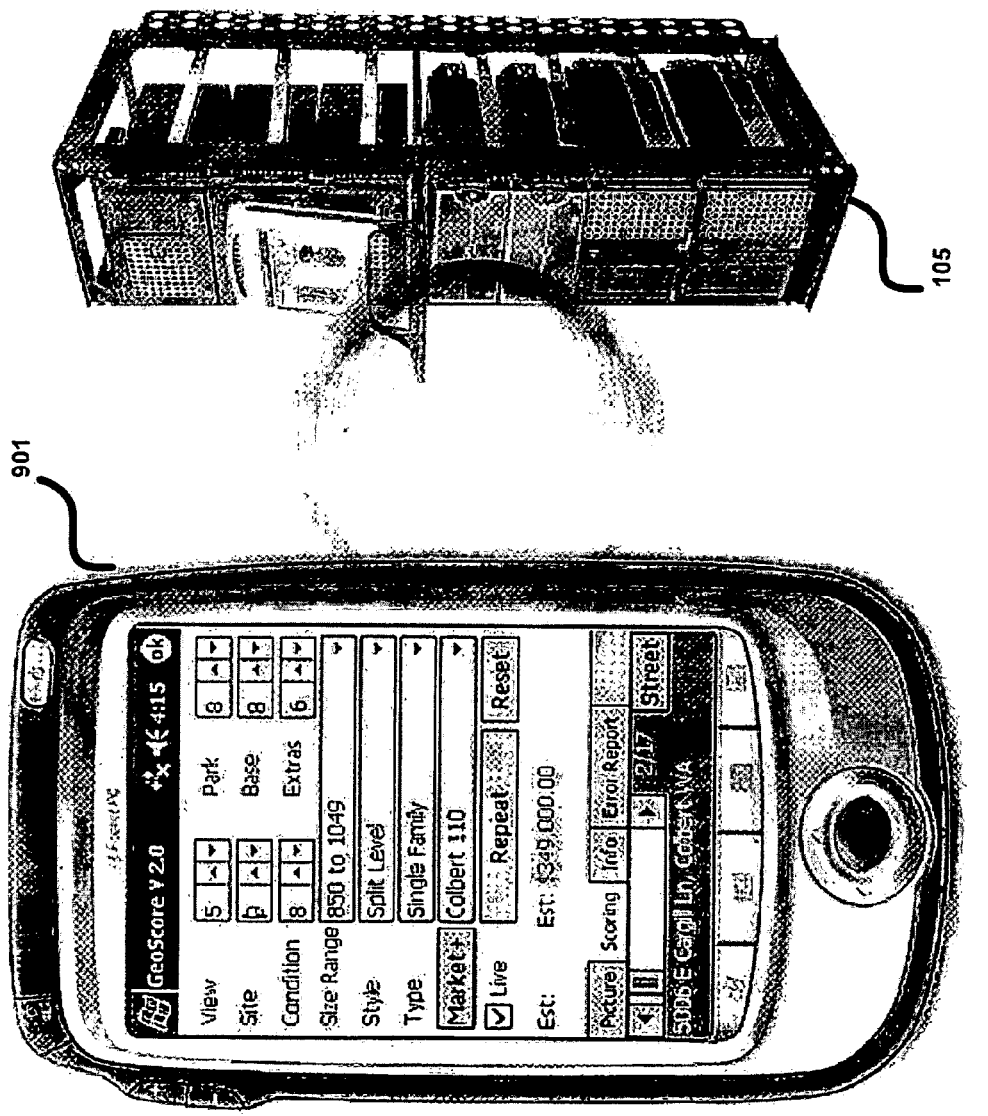

Quality control of files and data is performed via appraisal system 100 (e.g., text, image, audio, and video files in collector system 101 and/or property data in appraisal database 105 can be reviewed, checked, verified, or otherwise evaluated (e.g., in FIG. 14)) (step 607). Images are uploaded by the collector software associated with GeoPic™ collector database 121 to quality control personnel and collector system 101. After quality control and/or review by the personnel, the images within collector system 100, become readily available for use by appraisal system 100. A quality control measure checks each photograph (and can check the text, image, audio or sound, or video files) for incorrect address, description, or tax information (such as against a county assessor's information). The quality control also includes review of photographs, text, image, audio, or video files to prevent violation of privacy laws (e.g., disclosing confidential information, identification information or images, or other types of data or information). For example, review of photographs, text, image, audio, or video files can include removing or eliminating personal identifiers (e.g., license plate numbers from cars in the file, names visible on or around the house, people in or around the house), identifying symbols (e.g., garbage on the lawn, unique structures on or around the property), or other undesirable information (e.g., poor photograph quality, poor framing of photograph, or other). A database or data (e.g., in an HTML (HyperText Markup Language) file) either within the appraiser's portable communication device 1501 or within collector system 101 (e.g., GepPic™ collector database 121) is quality checked. A notification of quality control failures or errors can be sent to the user (e.g., via an automated email) allowing the user to correct the failure or error (e.g., take another photograph, record video, or correct other data). Collector system 101 performs various address matching and formatting (e.g., in accordance with the United States Postal Service standards of another desired standard). Collector system 101 formats and validates each address for each photograph (e.g., photograph can be held on a file server). For example, formatting can include meeting United States Postal Service postal standards. Validating can include checking the property data against a county assessor's parcel data (e.g., in SQL (Structured Query Language)). The photograph (and optionally the text, image, audio or sound, or video files) of each property along with the formatted address information is integrated with each property's parcel information (e.g., a county assessor's parcel data). Any failures or errors in the matching, formatting, or validating process are recorded, researched, and corrected.

Appraisal system 100 notifies the appraiser or another entity if there is a quality control error (step 609). Appraisal system 100 (e.g., via collector system 101) formats and validates the files and data (step 611). Appraisal system 100 (e.g., via collector system 101) integrates the files and data into appraisal database 105 (step 613). Appraisal system 100 allows access to the files and data in appraisal database in order to generate one or more appraisal reports 206 (step 615). By photographing, accessing data, performing quality control, validating and formatting data, appraisal system 100 creates appraisal database 105 for use in appraising properties.

Appraisal system 100 creates appraisal database 105 that includes data to fill in a variety of appraisal forms. Many industry standard forms do not require an interior inspection, but such standard forms may require detailed research on market conditions for a particular property. In these instances, appraisal system 100 can deliver a USPAP compliant appraisal report 206 instantly by automatically transferring the appraiser's research into the appropriate form at the moment of order. This research (e.g., data) could include property attributes and photographs of the subject property and all comparable sales along with the appraiser's research, comments, adjustments, final value estimate, and signature for the subject property. Where a particular data point is not contained in the appraisal database 105, the local appraiser can collect that information after the appraisal order. For example, the appraisal database 105 is compatible with the Uniform Residential Appraisal Report (URAR) form. The URAR is a standard appraisal form used and recognized by the real estate industry for full interior appraisals that are completed. Typically, each real estate appraisal in the United States, for example, requires an appraisal by a certified appraiser whose work is USPAP (Uniform Standards of Professional Appraisal Practice) compliant. Without this appraisal, lenders typically cannot transact with customer 107 nor will lenders be able to trade their loan portfolios with other parties. Thus, it is desirable to have appraisals that are USPAP compliant.

Appraisal system 100 uses a hotloading cycle to retrieve data from collector system 101 (e.g., from a collector database 121) and/or appraisal database 105 and automatically populate appraisal and/or property valuation form to be used for a given property appraisal in the appraisal system 100 (e.g., the property appraisal can be delivered immediately to customer 107). A hotloading cycle can include a request for interior inspection of a property (e.g., customer 107 sends a request to appraisal system 100 for the inspection), appraisal system 100 receives the request and sends a hotload report to an appraiser (e.g., after step 120), the appraiser does a physical inspection of the property, and the appraiser sends the inspection report to appraisal system 100 or directly to customer 107. Appraisal system 100 can receive the request and send a hotload report to an appraiser. The research which has typically already been completed is imported into appraisal database 105 (e.g., traditionally used for appraisal report preparation). The appraiser can do a physical inspection of the property and send the inspection report (e.g., hotload report after step 120) to appraisal system 100 or directly to customer 107. Validation can also include correcting any errors within the county assessor's parcel data (e.g., editing the data within appraisal database 105 during the hotloading cycle).

Figure 4:
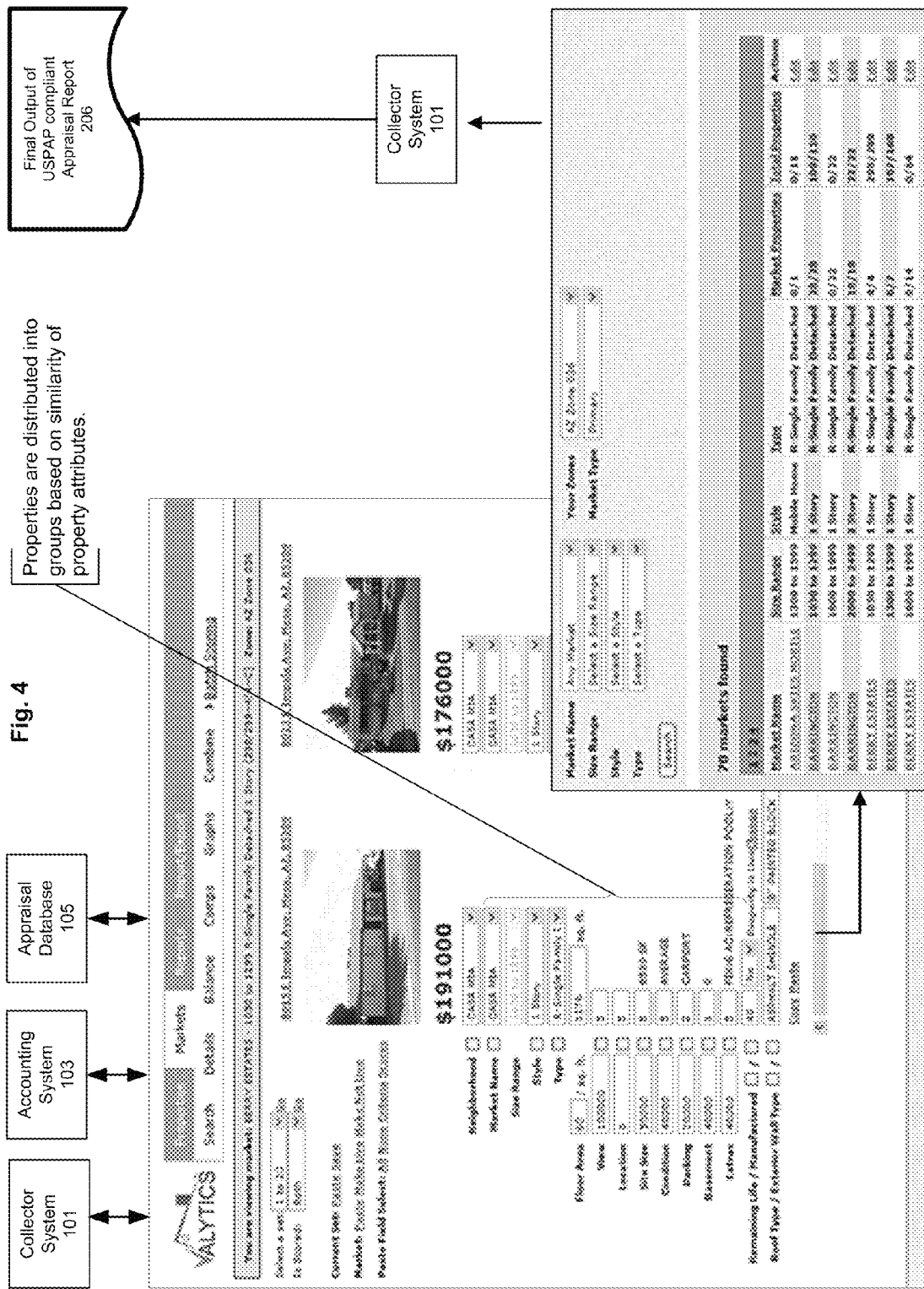
FIG. 4 illustrates screen shots from running market analysis software on a scoring system within an appraisal system in accordance with an exemplary embodiment of the present invention.

It would be desirable for appraisal system 100 to measure property values per city, zip code, or neighborhood. Each zone can be broken down or segmented into one or more market groups (e.g., by a local appraisal expert owning rights to that zone). For example, a particular market group may include the properties that are almost identical to one another within a particular neighborhood, a single zip code, or multiple zip codes depending on the property being valued. For example, a particular market group may include a particular neighborhood within a zip code, a single zip code, or multiple zip codes depending on the property being valued. A market group can be segmented by market name, such as by a subdivision, a community, or a predetermined geographic boundary. Appraisal system 100 identifies market groups by organizing all the different properties within a zone into groups (such as 1-level, 2-level, split-level, contemporary, and the like). Appraisal system 100 can further separate each type of group by size groups (such as 1600-1900 square feet in one group, 1900 to 2200 square feet in a second group, and so on). Appraisal system 100 can further separate these groups by external features (such as view, location on a busy road or golf course, school district, and the like). In one example, the identification of market groups and subgroups results in the identification of approximately 30-75 market groups within one zone (e.g., 40 on average). In FIG. 4, properties can be distributed into market groups based on similarity of a number of property attributes (e.g., 4 key property attributes: 1. same geographic area; 2. same type of property; 3. same style of property; and 4. similar size range of property). Each property is assigned a value for these four attributes and like properties with the same rating are grouped together to form a market group. The local appraiser expert selects a unique set of relevant comparable sales for each market group, which are utilized to determine the high and low end of value within the market group. The value of each home within such group is adjusted to reflect the differences observed by the scoring system. Market groups can be adjusted and updated periodically (e.g., every 30 days) by analyzing sales and listings (e.g., property listings, MLS (Multiple Listing Service) listings, or other) that have transpired during that period. If there is no activity for a particular market group for a period of time (e.g., 30 days), then values can still be adjusted based on data from other groups which support an overall trend in value (either up or down). An inactivity report can be generated for this market group, if desired.

Appraisal system 100 organizes the text, image, audio, and video files (e.g., photograph and sound files), formatted address information, and each property's parcel information. Appraisal system 100 uses the text, image, audio, and video files (e.g., photograph and sound files), formatted address information and each property's parcel information to score and sign-off (e.g., validate) each property's value (e.g., in a zone). Appraisal system 100 integrates information about a large number of properties per zone (e.g., per neighborhood, community, city, county, state, region, or country) and uses this information to provide fast, accurate property appraisals for each property. Appraisal database 105 is populated with photographs and data about each property for each zone. Appraisal system 100 can access or purchase common data from title insurance companies (such as First American™ and Fidelity National Financial™) as well as from county tax assessors, MLS (Multiple Listing Service) and regional realtor boards. Appraisal system 100 can also access each appraisers existing data. For example, a zone can be defined by one or more zip codes. Zip codes change overtime, although the boundaries for each zone do not need to. In one example, each zone is identified based on a census (e.g., the 2000 census in the United States) with an average of 10,000 properties per zone (although there can be any number of properties in a zone).

In one example, appraisal system 100 organizes the files (e.g., photographs), formatted address information, and each property's parcel information into an online appraisal application. To address the magnitude of appraising millions of homes across a country (e.g., the United States), addresses are segmented into geographic zones that contain approximately 10,000 addresses each. Zones are assigned (e.g., sold) to local appraisers who can aid in the analysis and specialize in understanding the value of every property in their zone. Each appraiser can add detailed property-specific data to each property within their zone. Each appraiser can aid in maintaining each property's data current and adding hew data for each property as it becomes available. Each appraiser can go into the field and judge each property subjectively and rank it under a number of predetermined, recognized appraisal fields. These fields are recorded in appraisal database 105. It is each appraiser's subjectivity and physical inspection of each property that allows appraisal system 100 to provide accurate valuation of each property. Appraisers that purchase one or more zones from appraisal system 100 often have their own teams of appraisers that collect data and prepare appraisals over the traditional five to ten day time frame. Appraisal system 100 represents a consolidation opportunity of a very fragmented industry providing a level of standardization sought by regulators and institutional users of appraisals. An appraiser with already substantial volume would be able to purchase zones, which they consider to be assets, and increase their own business as a result. The appraiser can generate added revenue as the customer base of appraisal system 100 grows to include high-volume regional, national, and international lenders that request many appraisals at a time. Appraisal system 100 provides added efficiency to the appraiser, which in turn can allow that appraiser an opportunity to lower overhead by reducing their appraisal personnel. Appraisal system 100 uses the files (e.g., photographs), formatted address information, parcel information and a physical appraiser's inspection of each property from the street to score and sign-off (e.g., validate) each property's value. Appraisal system 100 integrates the data and value estimates from thousands of zones into one comprehensive, nationwide database (e.g., appraisal database 105) to provide fast, accurate property appraisals for any property customer 107 may require or desire an appraisal for.

In one example, customer 107 logs into appraisal system 100 via the Internet or any network and requests an appraisal of a property (step 102). A search (e.g., address search, parcel number search, or other identifying data search) is performed in connection with the property (step 104). Once the property is found, customer 107 can view one or more photographs and property data in collector system 101 (step 106). If customer 107 wants an appraisal for the property, customer 107 can request an appraisal report 206 (step 108). Customer 107 can select the type of format for appraisal report 206 (e.g., an exterior based appraisal, an interior based appraisal, an exterior and interior based appraisal, a special request appraisal, or other) and this request is sent to collector system 101 (step 110). At any time, an appraiser can add, edit, or verify data and photographs associated with the property (step 122). For example, the appraiser can use software (e.g., Value Analytics™ software (e.g., ValueXplorer® solution or Strategic Management and Business Consolidation & Planning fools) or Microsoft Performance Point Server™ solution using Microsoft SQL Server and Sharepoint Server) compatible with a portable communication device 1501 to view, add, edit, or verify property data and photographs (e.g., even while at a property or site inspection). Collector system 101 assembles the appraisal data from appraisal database 105 and creates an accounting invoice via accounting system 103. Accounting system 103 can track which customer or entity buys data from the appraiser of appraisal system 100 (e.g., which banks or other customers are buying data from the appraiser). Scoring system 201 analyzes at least one of the appraisal data, photographs, and accounting invoice, and prepares appraisal report 206 (step 112) instantly or within a predetermined period of time (e.g., a forms generation web server assembles data from collector system 101 and appraisal database 105 to generate appraisal report 206 instantly or immediately after another inspection by the appraiser). Scoring system 201 can be separate from appraisal database 105 (as illustrated in FIG. 1) or scoring system 201 can be a part of or within appraisal database 105. Appraisal report 206 is delivered instantly or within a predetermined period of time to customer (107) (e.g., appraisal report 206 can be delivered electronically to customer 107 via the Internet or any network). Upon preparing appraisal report 206 (step 112), an appraiser may edit the report using web based software (e.g., ACI™ software (e.g., ACI Collection™ software, ACI Sketch™ software, ACI365™ software, Lighthouse™ software, or CRAL Collection™ software), ZOOware™ software, or the like) (e.g., via a hotloading cycle) (step 114). As such, appraisal report 206 can be the original appraisal report from step 112 or an edited or revised appraisal report after a hotloading cycle from step 120. If the web based software determines that a property or site inspection is required, then the web based software notifies the appraiser to do a property or site inspection (step 116). The appraiser typically visits the property or site and sends any required information or data to collector system 101 via a portable communication device 1501 (e.g., Personal Data Assistant or Personal Digital Assistant (PDA) (e.g., Blackberry™ device, Treo™ device, or Apple iPhone™ or iPod™), cellular telephone, laptop computer, mobile device, converged device, handheld device, handheld computer, "Palmtop" device, handheld, and the like) (step 118). An edited appraisal report 206 is prepared and sent to customer 107 (step 120). Alternatively, the appraiser may edit the report (step 114) and send the edited report directly to customer 107 via a portable communication device 1501 (e.g., even while the appraiser is at the property or site inspection).

Figure 7:
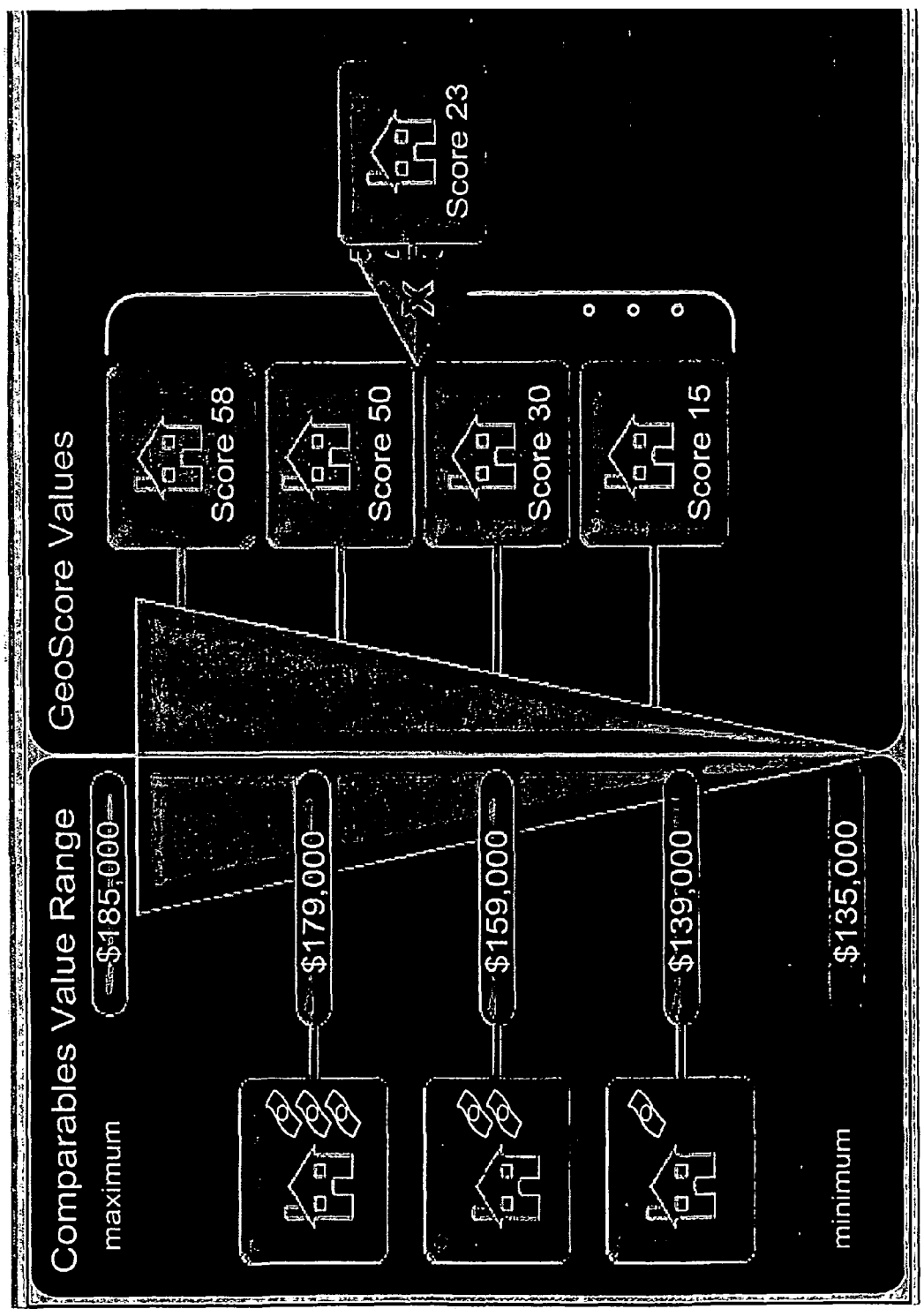
FIGS. 7 and 8 illustrate mapping of comparable sales to GeoScore™ scores (or values) in accordance with an exemplary embodiment of the present invention.
Figure 8:
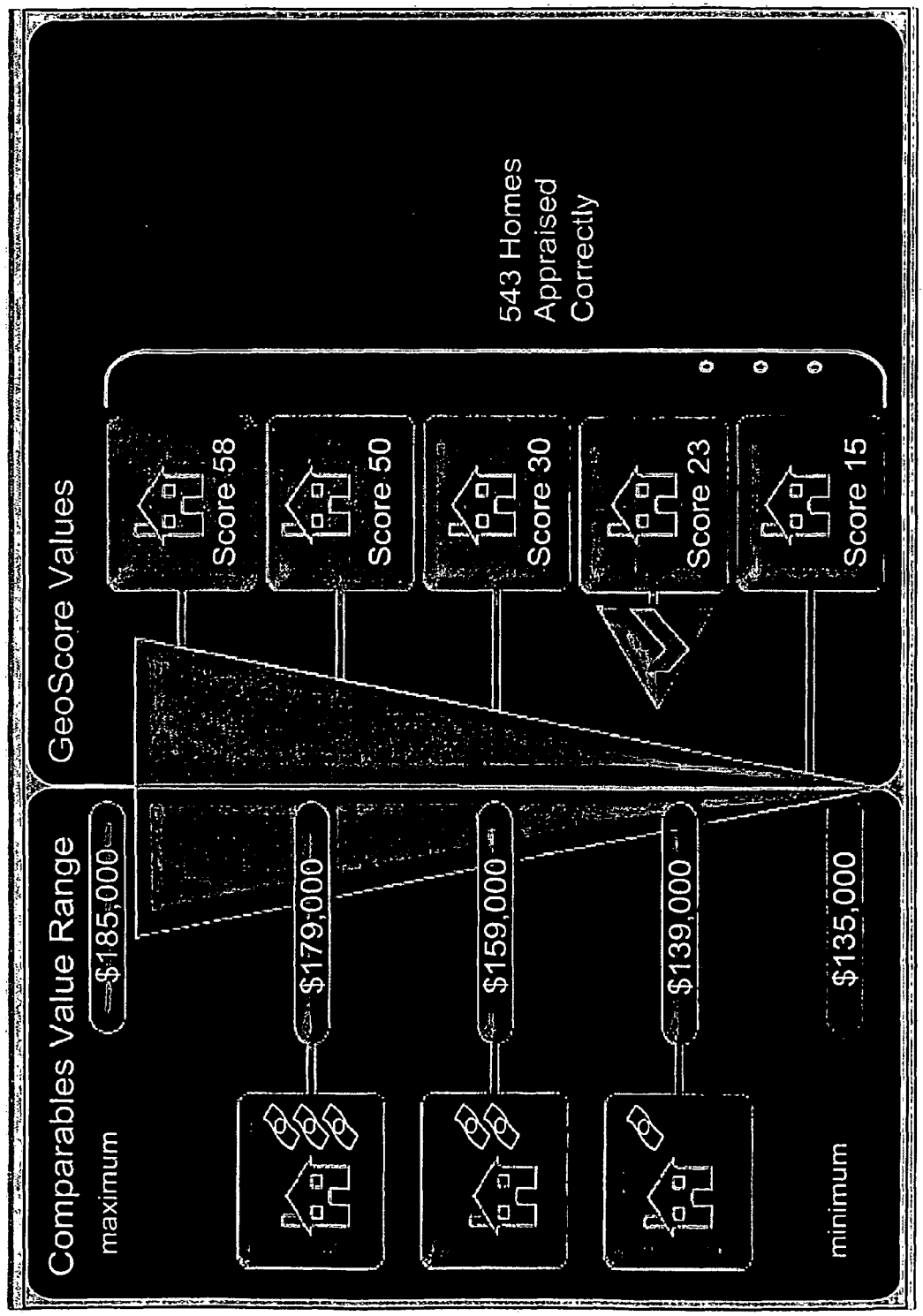
Figure 9:
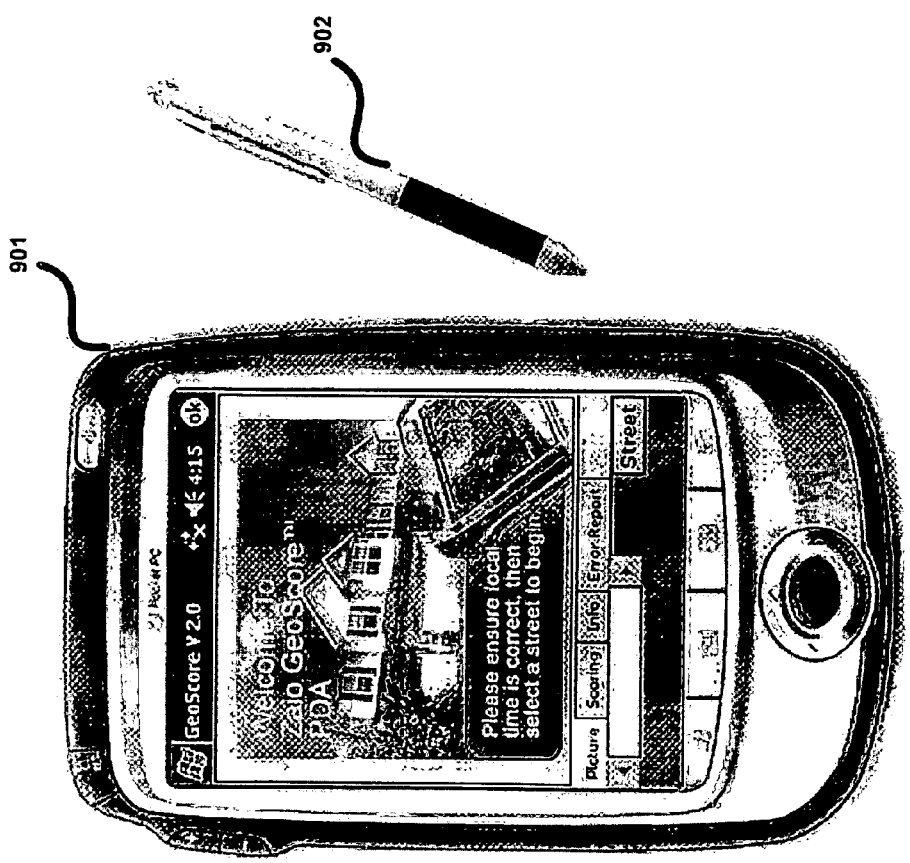
FIGS. 9-14 illustrate, exemplary embodiments of the graphical user interface of market analysis software 203: running on a portable communication device 1501 in accordance with an exemplary embodiment of the present invention.
Figure 10:
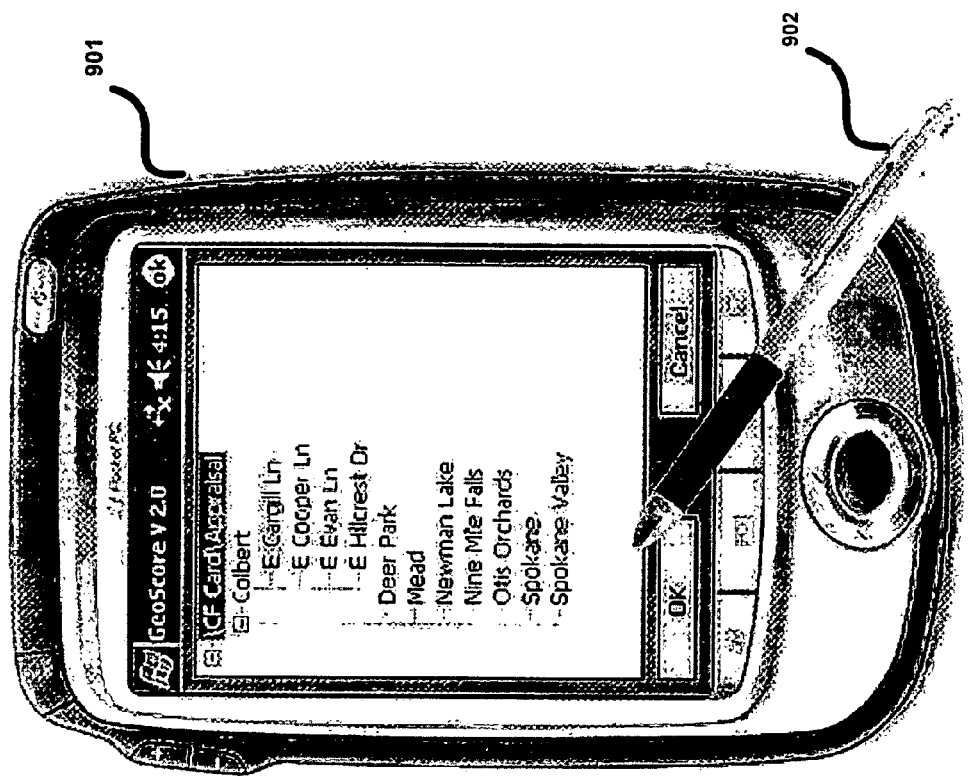
Figure 11:
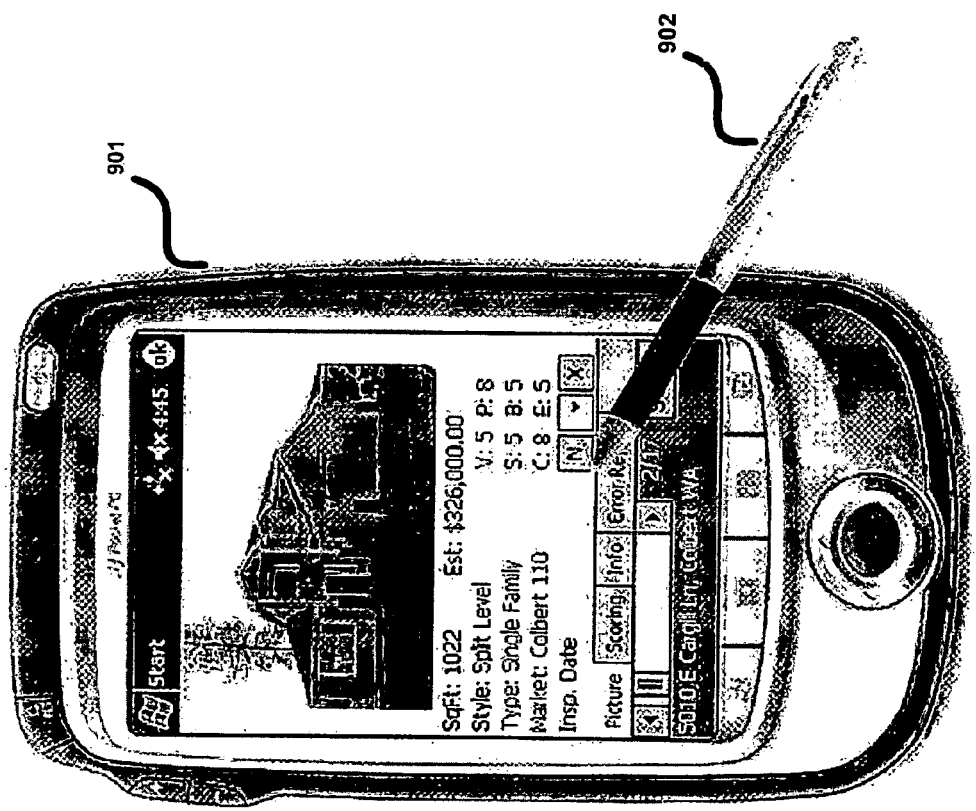
Figure 12:
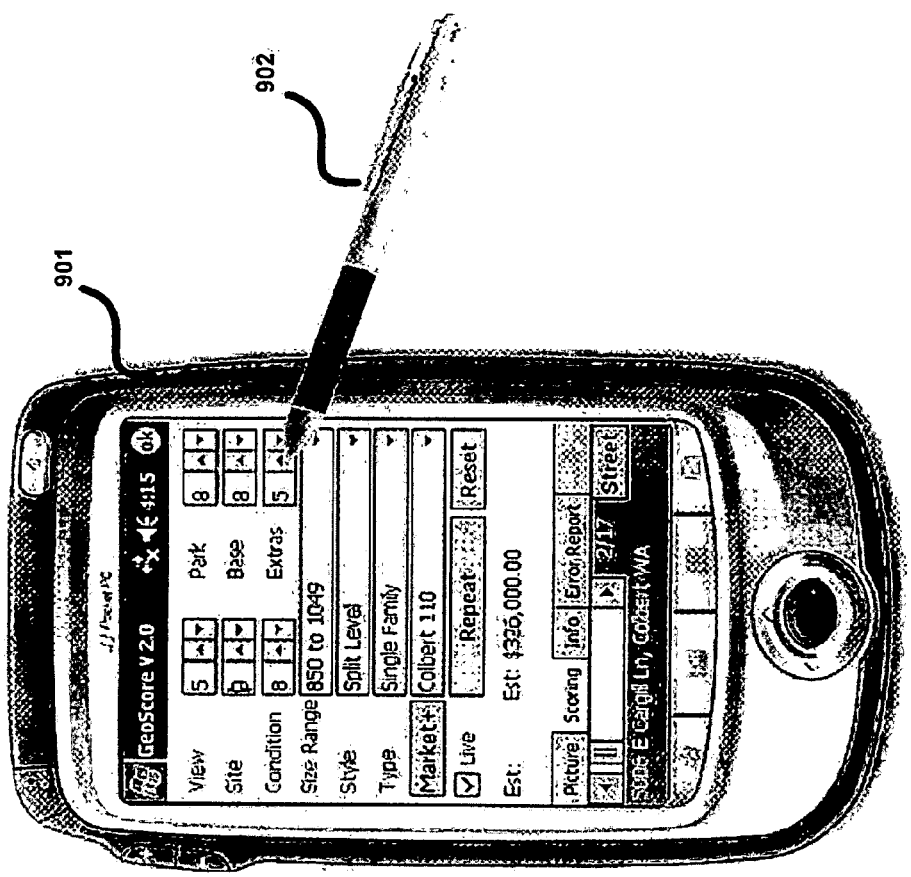
Figure 13:
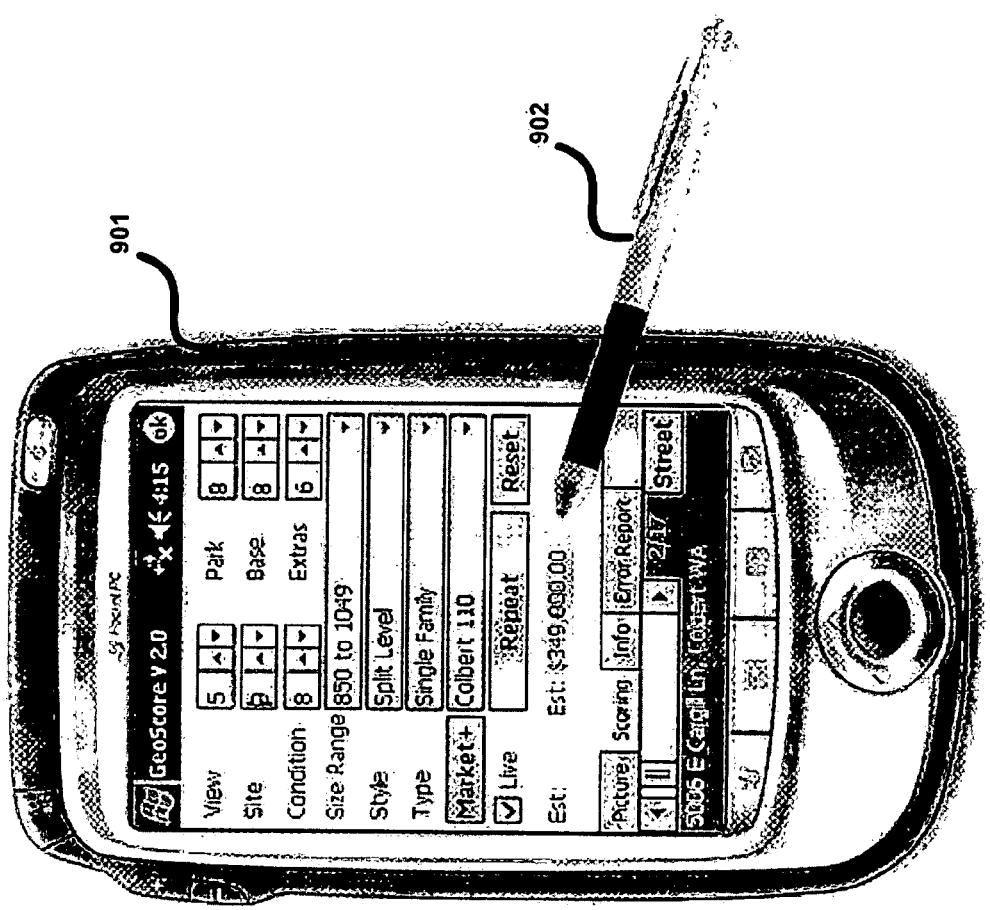

FIG. 2 illustrates an exemplary embodiment of scoring system 201 in accordance with an exemplary embodiment of the present invention. Scoring system 201 uses data from at least one of collector system 101, accounting system 103, and appraisal database 105 to score each property. Appraisal system 100 includes scoring system 201 to aid in appraising each property. Each home in a zone is inspected and detailed market analysis is performed in order to provide accurate and supported property values in a more timely fashion than traditional appraisal methods. A GeoScore™ score attributes a particular "score" to a property and that score can be cross-referenced or mapped with a range of all comparable sales, valuations, appraisals, and photos for that particular zone (not just three or four properties as is the case with traditional appraisal methods) (as in the examples of FIGS. 7 and 8). An appraisal using a GeoScore™ score is current (e.g., instantly or to within six months) and can be downloaded instantly by customer 107 for a fee per appraisal (depending on the location of the property and detail desired). Should more detail be desired, the appraiser for the related zone can update the appraisal and have that information sent to customer 107 instantly or within a 24-48 hour time frame.

Scoring system 201 uses various characteristics of a property that have been determined to affect a property's market value (e.g., from an exterior or interior inspection). Each characteristic of each property is rated by a local appraiser expert and given a score (e.g., from a 1 to a 10 with 1 being lowest and 10 being the highest/best) to create an overall score (e.g., a GeoScore™ score; such as ranging from 0 to 100). This scoring process 202 (e.g., GeoScoring process) associates one or more ratings with a piece of property. The characteristics include one or more of view, location, site, condition, parking, quality, utility (e.g., size of house), environment friendly features (e.g., solar panels, exterior siding), amenities, basement, extras, and garage. For example, a property with the following scores: view=4, location=5, condition=6, quality=5, utility=7, environment friendly features=2, amenities=4, basement=0, and garage=2 has an overall score of 35 out of 90.

Figure 3:
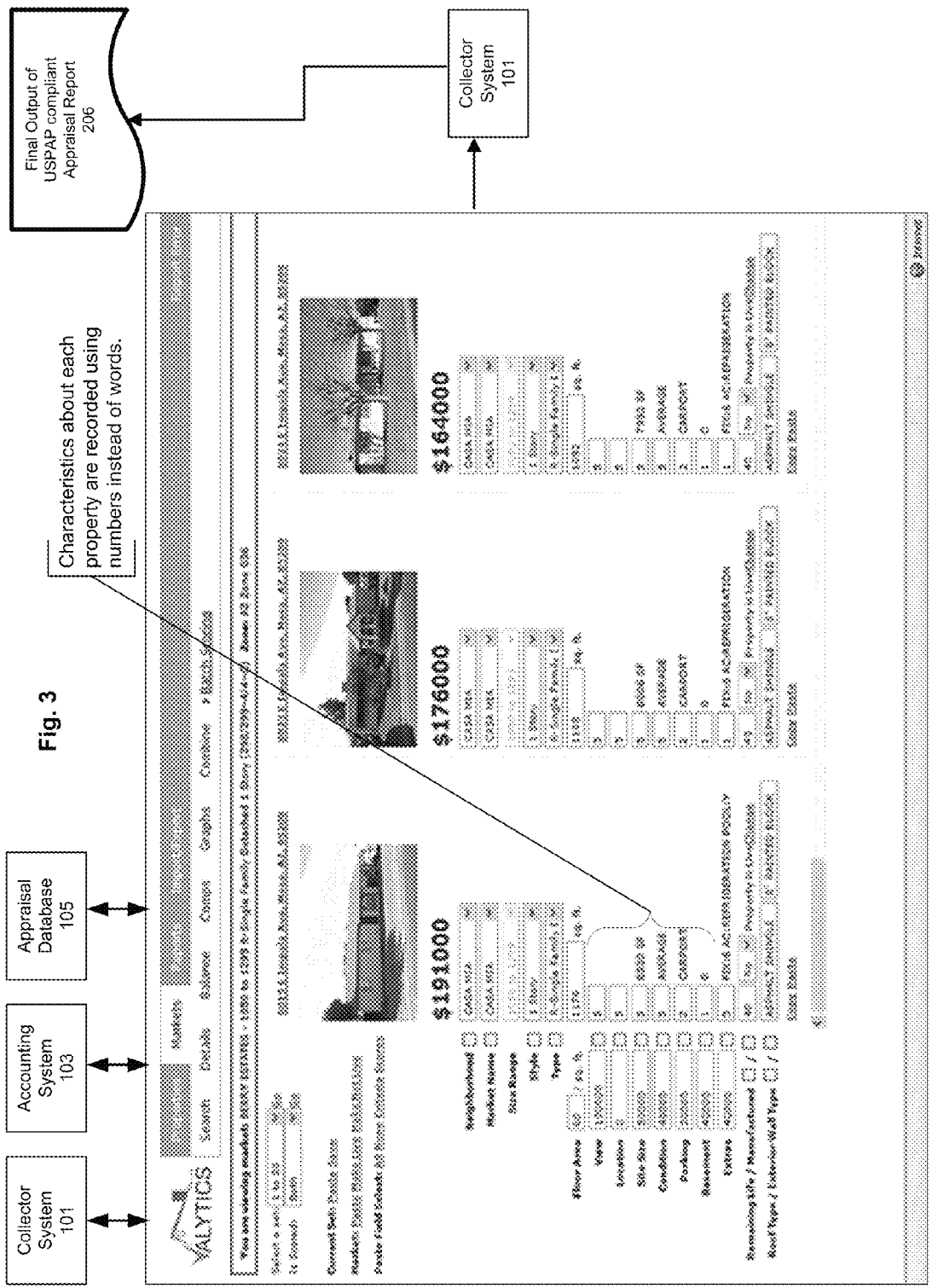
FIG. 3 illustrates a screen shot from running market analysis software on a scoring system within an appraisal system in accordance with an exemplary embodiment of the present invention.
Figure 5:
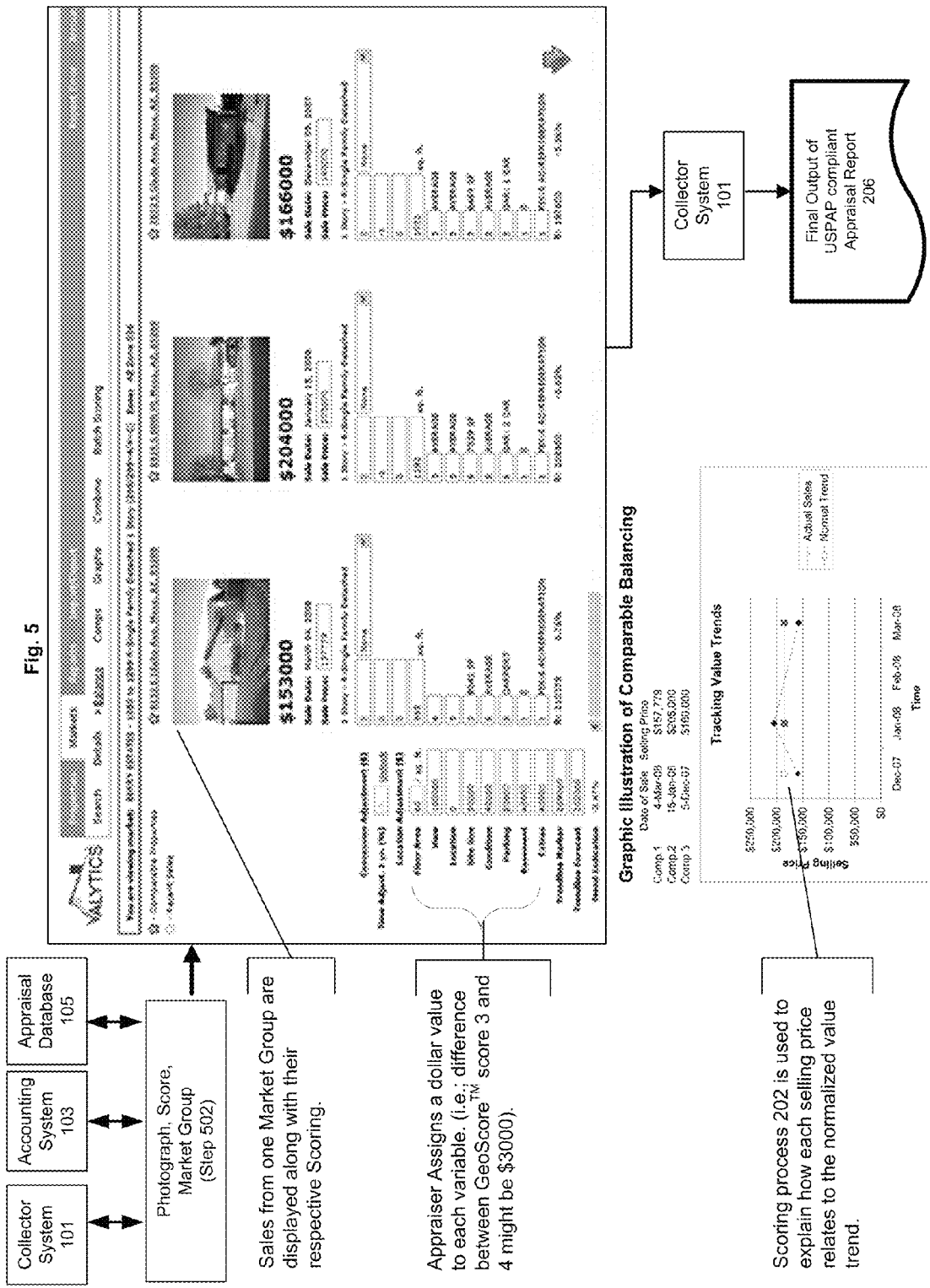
FIG. 5 illustrates a screen shot from running market; analysis software on a scoring system and a graphic illustration of comparable balancing of sales within an appraisal system in accordance with an exemplary embodiment of the present; invention.
Figure 17:
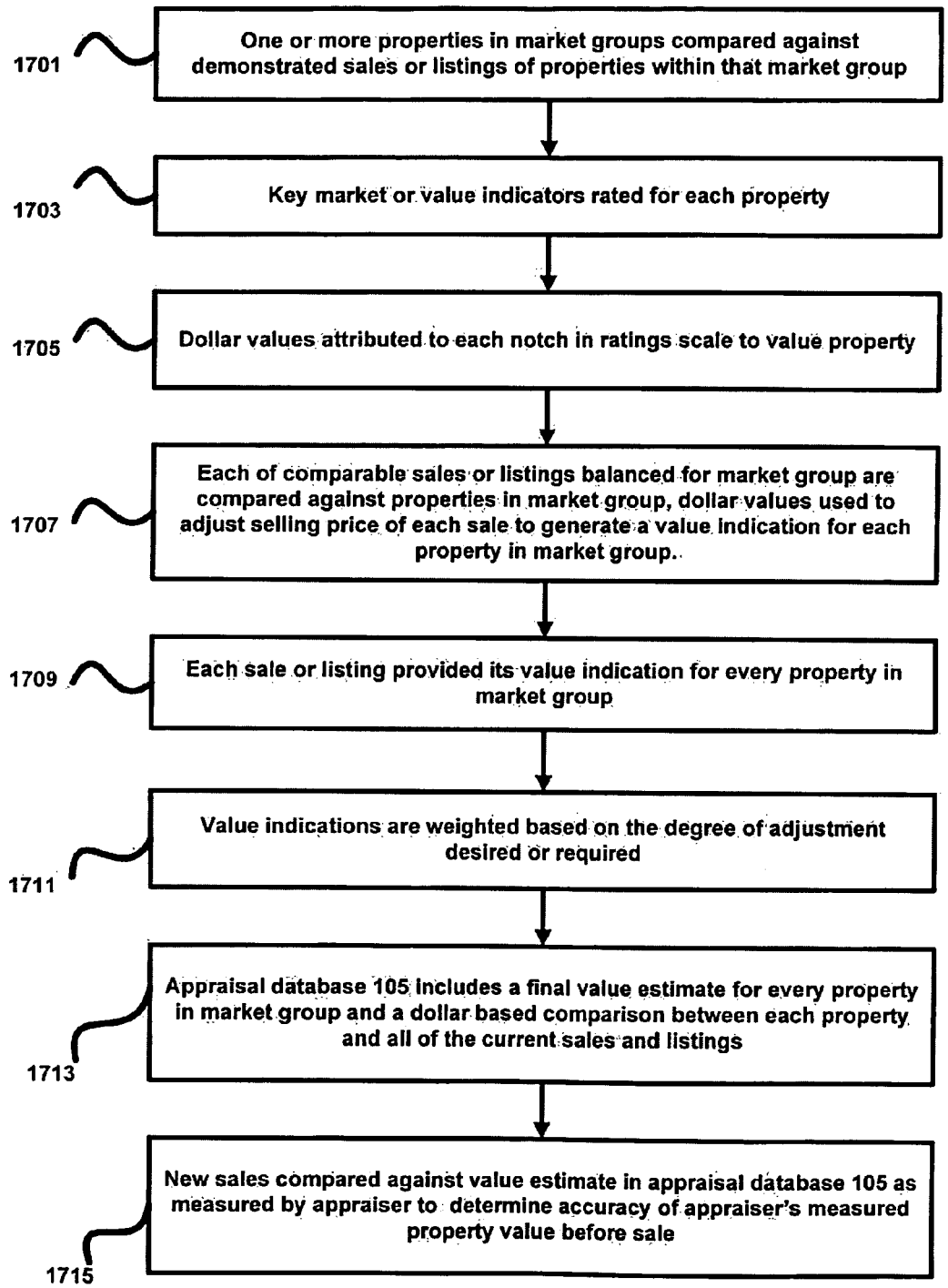
FIG. 17 is a flowchart illustrating a method for analyzing one or more zones, market groups, and comparable sales using market analysis software 203 to generate a value for each property based on one or more scores and evaluate the value in accordance with an exemplary embodiment of the present invention.

In one example of FIG. 17, once one or more properties have been placed in one or more market groups, each property in a market group can be compared against demonstrated property sales or listings of homes within that market group (step 1701). Scoring system 201 rates six (6) characteristics of a property that have been determined to affect a property's market value. Each characteristic of each property is rated by a local appraiser expert and given a score to create an overall score (e.g., a GebScore™ score, such as ranging from 6 to 60). The characteristics include view, site, condition, parking, basement, and extras. For example, a property with the following scores: View=4, Site=5, Condition=6, Parking=5, Basement=7, Extras=6 has an overall score of 33 out of 60. Additional rating categories may be added. In the past, the appraisal industry did not have a consistent method to record these characteristics or features consistently from property to property; however, scoring system 201 can provide such a method. The appraisal industry simply uses words (e.g., Good, Average, Very Good) and records the difference between two properties in terms of dollars only. As these dollar values change with supply and demand, all comparison ability between a sample sale price and a property being appraised is lost over time. Scoring the properties with numeric values using scoring system 201 (rather than just in terms of dollars) allows for automated comparison. Each increment on the scale from 1 to 10 can be assigned a value and these values can be gleaned from actual sales transactions that are occurring everyday. Key market or value indicators (e.g., location, view, site, condition, parking, or other) are rated for each property on a scale from 1 to 10 (step 1703). For example, 1 is the lowest or worst in the market group and 10 is the highest or best in the market group (e.g., 5 can be considered typical). Dollar values can be attributed to each notch in the ratings scale to value property (step 1705). For example, if the appraiser determines that the difference between a home in average condition and one in good condition is $5000 the scores may be 5 and 6 respectively and the appraiser assigns a value of $5000 to one notch on the scoring grid. This appraiser's judgment can be applied consistently across the entire market group. Each of the comparable sales or listings that have been balanced for the market group can be compared against all of the properties in the market group (step 1707). The dollar values can be used to adjust the selling price of each sale, so that the sale generates a value indication for every property in the market-group (step 1707). Each sale or listing can be provided its value indication for each property in the market group (step 1709). For example, if there are 10 sales being considered in the market group, then every property in the market group has 10 possible value indications. Value indications are weighted based on the degree of adjustment desired or required (step 1711). The degree of adjustment includes the total absolute value dollar adjustment applied to the selling price of a comparable sale in order to arrive at a value for a particular property in the market group based on the difference in scores and dollars attributed to each score. Comparable sales with the lowest absolute adjustment percentage are typically given greater weight in the final averaging of all value indications. Appraisal database 105 includes a final value estimate for every property in the market group and a dollar based comparison between each property and all of the current sales and listings (step 1713). As new sales and listings occur, the appraiser replaces older sales with newer sales (e.g., in order to update the value of every home, in the market group). The appraiser determines if the new sale is consistent with the market trend and that the sale, is legitimate. New sales (e.g., as they occur) are compared against the value estimate then contained within appraisal database 105 as measured by the appraiser (step 1715). This comparison determines how accurately the appraiser measured the property's value before it actually sold. As such, the appraiser has feedback as to the appraiser's ability to accurately measure value. Examples of information used in scoring system 201 in accordance with exemplary embodiments of the present invention are illustrated in FIGS. 3, 4, and 5. For example, in FIG. 3, data about each property can be recorded using numbers instead of words. A rating scale from 1-10 is employed for any number of characteristics (e.g., 7 factors). In this example, a "1" represents the worst while a "10" represents the best relative to competing properties in the area. In FIG. 5, photography and scoring process 202 are performed and one or more market, groups are determined (step 502). Step 502 is used to create one or more GeoScore™ scores for a property. In FIG. 5, sales from one market group in a predetermined period of time (e.g., past 12 months), are displayed along with their respective GeoScore™ scores (e.g., high scoring homes should have sold high). An appraiser assigns a dollar value to each variable (e.g., in FIG. 5, the difference between GeoScore™ score 3 and 4 might be $3000). In the example of FIG. 5, scoring process 202 is used to explain how each selling price relates to the normalized value trend. If a property sells high and is scored high, the scoring process 202 indicates that it makes sense. If the property sells high and the appraiser cannot justify the price in the GeoScore™ score, then the sale can be recorded as non-arms length sale.

Figure 16:
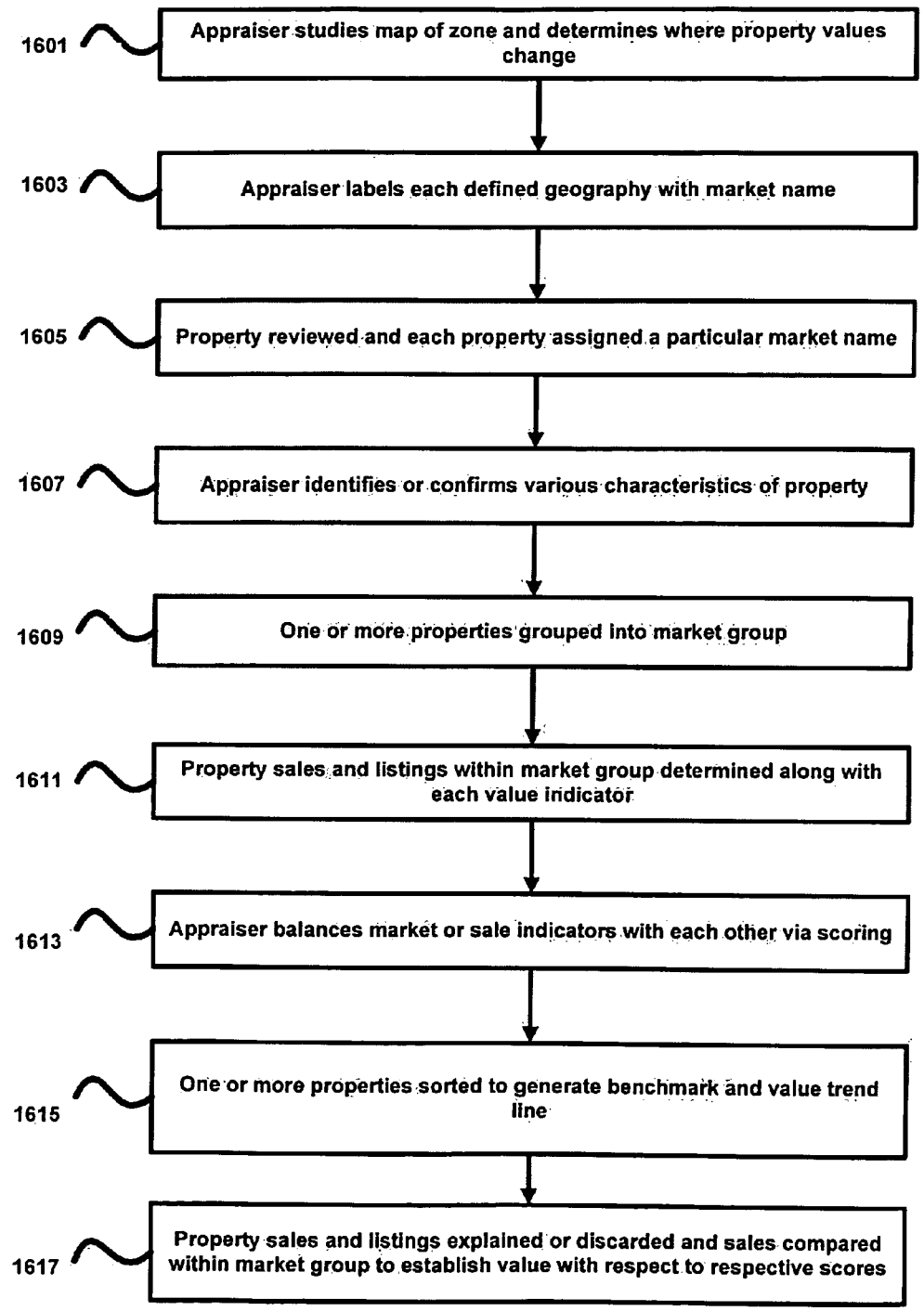
FIG. 16 is a flowchart illustrating a method for analyzing one or more zones, market groups, and comparable sales using market analysis software 203 to generate a value for each property based on one or more scores in accordance with an exemplary embodiment of the present invention.

With, further reference to FIGS. 1, 2, and 16, appraisal system 100 analyzes one or more zones, market groups, and comparable sales using market analysis software 203. Sales are searched and selected by the appraiser (e.g. appraiser studies a map of one or more zones and determines where property Values change, such because of location differences (step 1601)). Scoring system 201 includes market analysis software 203 (e.g., Value Analytics™ software (e.g., ValueXplorer® solution or Strategic Management and Business Consolidation & Planning tools) or Microsoft Performance Point Server™ solution using Microsoft SQL Server and Sharepoint Server), which associates similar market groups with each other and makes it easy to find and analyze all comparable sales of listings for sale of a property. The appraiser labels each defined geography with a market name associated with a market group (step 1603). A property is reviewed and each property is assigned a particular market name (e.g., properties are reviewed on-line using market analysis software 203 and each property is assigned a particular market name) (step 1605). The appraiser identifies or confirms various characteristics of the property (e.g., the type of property, style of property, and size bracket for square footage of living or occupancy area of the property) (step 1607). One or more properties are grouped into a market group (e.g., properties are automatically grouped based on similar characteristics and the grouping is called a market group (where properties directly compete)) (step 1609). Once properties have been placed into market groups, certain market groups may be similar enough to be associated with each other to offer additional pools of comparable sales. Market analysis software 203 can provide the appraiser with a list of all potential comparable sales applicable for a given market group. The appraiser enters the relevant variables for comparison. These relevant variables include a value per square foot of floor area (e.g., the value can be in dollars ($) or a score) and an opinion of influence value for each of the scoring features (e.g., the value can be in dollars ($) or a score). As such, market analysis; software 203 can reconcile the various different selling prices with each other (e.g., describe why one property sold for more than another property). The opinion of influence value can be the dollars applicable for each notch in the scoring scale from 1 to 10. One of the techniques to reconcile sales is to adjust each selling price upward (using the variables entered by the appraiser) to reflect the value of a home that is rated 10 for all scored features and then adjust each selling price downward to reflect a home that is rated 1 for all scored features. If each sale provides a similar upper and lower end score, then the variables entered by the appraiser are proven to be valid and supported by the market. A second technique to reconcile sales is to compare all sales against a value trend line that is generated and stored periodically in appraisal database 105. With the value trend line approach each selling price is adjusted to indicate a normalized value. Normalized value is the value of an average home that has all scoring features rated as five (5) (or what is typical of that market group) and where the property's floor area is exactly the middle of the size range. For example, the normalized values provided by each sale are considered accurate if they are within about 5% above or below the value trend line for the prior month. Of course, any percentage above or below the value trend line can be set as the normalized value(s). The value trend line may be the mean average, of all normalized values each month. With this approach, appraisal database 105 can accurately track the change in values over time due to supply and demand of the real estate market. The trend line approach also allows the appraiser to identify sales that appear to be non-arms-length (sold well above or below what is typical for that market group).

One of the more difficult, aspects to appraisal involves proving or supporting adjustments by market indicators. Both of the above methods for reconciling disparate selling prices can be used to prove and support the appraiser's adjustments for condition, parking, site, extras, and the like. One of more property sales and listings within a market group are determined and can be displayed along with the value indicators (e.g., selling price or listing price) of each property sale and listing (step 1611). Using Ceterus Parabus analysis (i.e., all things being equal), market analysis software 203 can isolate just one of the variables and provide support for that particular adjustment. Market analysis software 203 provides support for the opinion of influence value entered by the appraiser and helps the appraiser identify when that opinion of influence value is not indicative of market conditions. Both of the methods for reconciling selling prices use a mathematical form or method commonly referred to as linear regression.

The appraiser can balance the market or sale indicators with each other by reviewing and adjusting how each market or sale indicator is scored (e.g., if the property sold high then the score can be high too) (step 1613). One or more properties can be sorted to generate a benchmark and a value trend line (step 1615). For example, one or more properties can be sorted (e.g., by date of sale) and each sale defines the price of a benchmark (or typical) home at that point in time (step 1615). The benchmark values produce a value trend line to accurately explain how property values are changing over time (step 1615). Property sales and listings can be explained or discarded and sales compared within a market group to establish their respective value with respect to their respective scores (step 1617). Once property sales and listings are explained or discarded (e.g., because they appear to be non-arms length sales), sales can be compared to all non-sold homes in the market group to establish a value for each home based on each of their respective scores.

Examples of various aspects (e.g., graphical user interface) of market analysis software 203 running on a portable communication device 1501 (e.g., a Personal Digital Assistant (PDA) 901 with a detachable stylus 902) are illustrated in FIGS. 9-14.

In one example, as employers often assist employees with relocation, accurate appraisals are becoming a growing segment of the appraisal market. Employers across the United States desire a solution that quickly compares the value of the employee's existing property to one in the new location. Appraisal system 100 offers a solution that allows the employer to purchase an appraisal for the employee's existing home and then performs a search within appraisal system 100 (e.g., within appraisal database 105) for a comparable property in the new region. This provides appraisal system 100 with two appraisal sales for the same customer 107.

Appraisal system 100 can be used in any country in the world. Also, foreign banks have shown interest in various other countries' marketplaces given those countries' higher quality mortgage, portfolios. For instance, the Canadian subprime market consists of about 5% of outstanding mortgages compared with about 20% in the United States.

A zone can be sold to an appraiser of any other entity, retained by appraisal system 100, or licensed to an appraiser or other entity. Qualified appraisers can purchase one or more zones, for a fee. Zone sales can be via a web-based platform or otherwise. Appraisal system 100 can split any revenue for all products and services sold pertaining to that particular zone with the zone owner. An appraiser can buy any number of zones, where each zone purchased involves a one-time fee that automatically renews after a period of time (e.g., five years). Such a fee can be subject to negotiated changes with respect to royalty provisions or considerations made if the appraiser is dismissed for poor performance. Typically, appraisal system 100 must approve any resale or transfer of a zone: by the zone owner. To aid in evaluating each appraiser, characteristics of each appraiser can be considered (e.g., appraisers with a market, share of 3-5% in their respective regions, licensed or certified appraisers, or other relevant characteristics). To aid in a property valuation, a licensed of certified appraiser can be assigned to a zone, the photographing of each property can be performed, and appraisal system 100 can perform a market analysis and scoring associated with the property. Appraisal system 100 can calculate an appraisal value for any property in the United States or Other countries.

In one example, the sale of a zone can produce revenue for appraisal system 100. Appraisal system 100 sells a zone to an appraiser for approximately US$9,000. The appraiser provides a deposit of US$500 to appraisal system 100. After a 48 hour cancellation window (or any other time period) from the time of the sale, appraisal system 100 recognizes the deposit immediately as revenue. The unpaid balance due from the appraiser (US$8,500) is paid within 30 days to appraisal system 100 and usually upon receipt is it reflected as deferred revenue on the balance sheet. Costs are expensed as they are incurred while appraisal system 100 typically recognizes deferred revenue when all photos are complete and data is populated for that particular zone. This usually occurs 8-12 months from the date that appraisal system 100 receives the unpaid balance; however, it can be much sooner.

When properties that are valued in appraisal system 100 sell, the actual selling price is incorporated into appraisal system 100 as a part of an appraiser report card 205 that evaluates the appraiser's appraisal value and appraisal report 206. Appraiser report card 205 provides a feedback loop into appraisal system 100 via appraisal database 105, so that actual sales price can be compared with the measured property value to verify accuracy of or adjust (to help rune) scoring system 201 characteristics. For example, if a location was scored as a 5, but the sales price analysis in appraiser report card 205 indicates that the location for a particular property should have been a 7, then this feedback loop provides error correction for other property appraisals. As such, scoring and any changes are synchronized back to appraisal database 105 and market analysis software 203, so that updated and accurate appraiser report cards 205 can be made.

Once collector system 101 has generated data into collector database 121 and appraisers are using collector database 121 to produce one or more appraiser report cards 205, appraisal system 100 includes an ongoing data maintenance process. Maintenance of collector database 121 is desirable since lenders and other customer(s) 107 rely on immediate access to updated and accurate information. The ability to attract and retain appraisers includes quality control and the continuous improvement of appraisal database 105. Accuracy is desirable as well. The appraisers are continuously fine-tuning the appraisal value of each property within their respective zone(s) to consider various conditions (e.g., new construction, natural factors (e.g., floods, fire, and winds), and other conditions), which are a part of a property's value. Appraisal system 100 uses appraiser report card 205 for quality control personnel to continuously monitor appraisal accuracy by comparing posted appraisal values to real market transactions involving the same property. If there is a significant variation on too many property valuations in a specific zone, the appraiser or zone owner of that zone can be questioned as to why there are discrepancies and make modifications to the appraisal values accordingly.

Because property characteristics are changing regularly, photographs and descriptive ratings (e.g., attributes, score, or other information) of each property are regularly updated. Appraisal system 100 includes a process whereby data from collector database 121 can be exported to a portable communication device 1501, which can be physically carried into the field (e.g., geographic area). While in the field, the photographer or appraiser can view the information currently contained in collector database 121 and appraisal database 105 via a portable communication device 1501 and compare the information against the actual property physically being: viewed from the street. This process verifies accuracy of the data in collector database 121 and appraisal database 105 while also generating work orders to collect new photographs, re-score the property, or correct errors right at the particular geographic location. The appraiser can, for example, view the current value estimate, photograph, and score for the property while also physically viewing the property itself.

Figure 15:
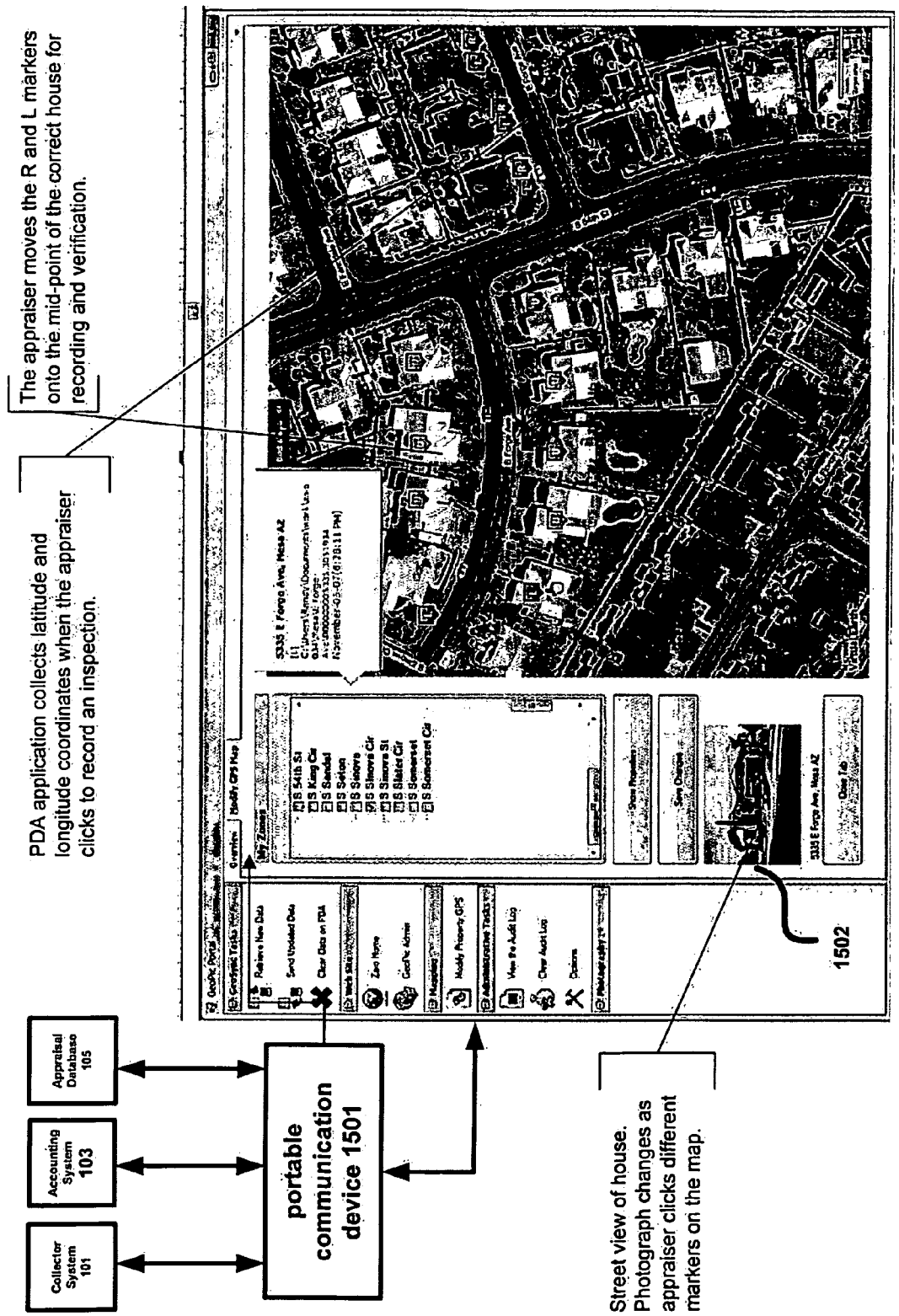
FIG. 15 illustrates verification of data using GPS satellite map in accordance with an exemplary embodiment of the present invention.

For example, in FIG. 15, the appraiser can view a photograph or other data in the GeoPic™ collector database 121 while physically at a property location (e.g., a verified property at a given real-world address). A photograph 1502 in FIG. 15 changes as the appraiser clicks different markers on the GPS satellite map (e.g., via a portable communication device 1501, such as a PDA). The PDA application collects latitude, longitude, and altitude: coordinates (e.g., GeoCode™ coordinates) when the appraiser clicks to record an inspection of the property. The appraiser verifies the existence of a real world address by collecting the latitude and longitude coordinates. The address of the property has corresponding GeoCode™ coordinates that shows where, the appraiser was standing; on the street during this physical inspection. The PDA application also records if the property (e.g., house) is on the right or left of the view relative to the waypath the appraiser is walking (e.g., right or left on the GPS satellite map in FIG. 15). When data is synchronized with appraisal system 100 (e.g., collector system 101), a GPS satellite map or view appears oh a web-page as illustrated in FIG. 15. The appraiser can move the R (right) and L (left) markers onto the mid-point of the correct property (e.g., house). By dragging and dropping the GPS marker on top of the actual property the exact latitude longitude, and altitude of every real world address on the street is verified (e.g., visually verified). A street view of the house is visible in FIG. 15 if there is any question. Software associated with the GeoPic™ collector database 121 re-calculates the latitude and longitude coordinates, so that the appraiser records and physically verifies the mid-point of every real world address of the property from the street. Once the address is verified, a U appears on the GPS satellite map. In this example of FIG. 15, the real world address at a particular physical location can be verified twice (e.g., once by the original photographer of the property and second by the appraiser verifying or checking the data). If the appraiser's physical inspection suggests that the condition has improved, the appraiser can adjust the rating for condition through the portable communication device 1501 and the portable communication device 1501 will display the new estimated value. When the portable communication device 1501 is synchronized with the appraiser's computer, all changes or work orders are automatically transferred back to collector system 101 (e.g., to collector database 121).

In summary, in one exemplary embodiment, photograph and property data for one or more properties are gathered (e.g., appraisal system 100 collects street photos of each property in a zone). Collector system 101 gathers photograph and property data for one or more properties and uploads the photograph and property data to one or more servers (e.g., collector system 101) in appraisal system 100. Collector system 101 checks each photograph and parcel data as quality control to aid in the accuracy of the information. Collector system 101 integrates the photograph and parcel data that passes the quality control into collector database 121 (e.g., merges the photos with existing parcel data and official government identifiers). Geographic areas are divided into one or more zones, market groups, or market names. Appraisal system 100 divides a geographic area into one or more zones, market groups, or market names (e.g., outlines competing properties in a market group). For example, ArcView™ GIS software (from ESRI) for visualizing, analyzing, creating, and managing data can be used to divide the geographic areas. Scoring system 201 uses the photograph and parcel data in collector database 121 along with one or more characteristics to calculate a score for each property (e.g., compares each property with all competing homes that have recently sold and establishes a current value estimate for each home). One or more characteristics associated with each property are analyzed and each given a value and this information is used to calculate a score for each property. Market analysis software 203 within scoring system 201 uses each score, market group information, and comparable sales for each market group to generate appraisal report 206. An appraisal report 206 is generated using the score for the property. Appraisal report 206 can be accessed (e.g., a bank can access appraisal report 206 via a portable communication device 1501). Appraisal report 206 can be used by an appraiser, customer 107, or any other entity desiring property value information. Appraisal report 206 can be adjusted depending on whether data needs to be updated or further information in association with that property is desired. The appraiser verifies the data a second time from the street and collects the latitude and longitude coordinates for each real world address in order to keep track of what properties have been completed. The appraiser or photographer network keeps property values current (e.g., monthly or any other period of time) and the property data and photo current (e.g., annually or any other period of time). Appraisal system 100 provides accurate, physical site-verified property data, where the data is independent, objective, and fully supportable.

The present invention may be embodied as one of more of a method, a system, a device, and a computer program; where each method, system, device, and a computer program can include software and/or hardware components. The present invention is described using block diagrams and flowcharts to illustrate means for performing the described functions of the method, system, device, and computer program. The computer program can include a computer-readable storage medium having computer-readable program code means embodied in the storage medium. The system can include a host system including a processor for processing data, a memory in communication with the processor for storing the data, an input digitizer in communication with the memory and the processor for inputting the data into the memory; and an application program stored in the memory and accessible by the processor for directing processing of the data by the processor. The application program can be configured to perform a method. The system can include various integrated circuit components, such as microprocessors, controllers, memory elements, processing elements, logic elements, and look-up tables.

The user of the system can be a consumer desiring to access an on-line service, access a restricted area, purchase and/or sell a product, service of other item of commerce, otherwise transact in commerce, and/or communicate with another entity. The user may alternatively be a merchant, a distributor, a supplier, a person, an entity, software, hardware, and/or the like desiring to transact or otherwise communicate with a consumer, a merchant, a distributor, a supplier, a person, an entity, software, hardware and/or the like. The user may interact with the system via any input device such as a computing unit, keyboard, mouse, smart card reader, biometric system, kiosk, personal digital assistant, handheld computer (Palm Pilot®), cellular phone and/or the like.

A host may be one or more of the following: a server, a personal computer, a mainframe, a distributed network (the Internet), a web service, and/or the like.

A database call may include, e.g., back-up data, tracking information, and/or the like. A database may be any type of database, such as relational, hierarchical, object-oriented, and/or the like. Common database products that may be used to implement each database include DB2 by IBM (White Plains, N.Y.), any of the database products available from Oracle Corporation (Redwood Shores, Calif.), Microsoft SQL Server by Microsoft Corporation (Redmond, Wash.), or any other database product. Each database may be organized in any suitable manner, including data tables or lookup tables.

A browser may be a client computer, such as a machine containing interface software used by the user. The browser may include PC, MAC, cell phone, PDA, kiosk and/or the like containing internet browser software, and/or network user interface software.

A web server may include a data center, such as a centralized server with remote fail-over, a distributed data center patterned after a Web Services model, one or more servers configured to receiver and respond to requests from the browser (such as one or more microcomputers Or mainframes), and/or the like. The web server may also include web server processes (programs that receive and respond to requests, such as CGIs, Java Servlets, JSP, ASP). The web server processes may communicate with static content (text, graphics, sound files, video, and/of the like using HTML, WML, MIME defined files, and/or the like) via one or more communication channels (operating system supported file read on static content, data retrieval from a datastore, and/or the like). The web server processes may also communicate with an application data request handler (Java Servlets, services, daemon processes, linked libraries, and/or the like) to receive and process requests for application (often dynamic) data.

Communication between functional blocks in the system may be via one or more communication channels such as an internet service provider, a network (Internet, intranet, extranet, wireless, VPN, Blue Tooth, telephone network, LAN, WAN), a network interface between a published external access point and a web server, point of interaction device (smart card system, point of sale device, personal digital assistant, cellular phone, kiosk), and/or any other means of communication. One or more communication channels may include internal server communication channels that carry data from a port to the web server (such as an inter-process communication (IPC) channel). One or more communication channels can use sockets, CORBA, RMI, MQSeries, and messaging protocol (XML, ASN, proprietary). One or more communication channels may include any system for exchanging data or transacting business, such as any hardware and/or software communication medium (telephone, modem, digital subscriber line, a global computer network, a wired link, a wireless link, any utility link), the Internet, an intranet, an extranet, WAN, LAN, and satellite communications. One or more communication channels may be implemented as any type of network, such as open network, secured network, an interactive television (ITV) network. One or more communication channels may be one network or multiple independent networks.

Any number of conventional techniques may be used for data transmission, signaling, data processing, network control, and the like. For security reasons, any databases, systems, or components of the present invention may consist of any combination of databases or components at a single location or at multiple locations; wherein each database or system includes any of Various suitable security features; such as firewalls, access codes, encryption, de-encryption, compression, decompression, and/or the like. The present invention could be used to validate data with a user-side scripting language, such as JavaScript of VBScript.

The present invention could be used in conjunction with any type of personal computer, network computer, workstation, minicomputer, mainframe, or the like running any operating system. The network may be a public network (insecure and open to eavesdroppers) or a secure network. Various systems and servers are suitably coupled to the network via data links. A variety of conventional communications media and protocols may be used for data links. A connection to an Internet Service Provider (ISP) over the local loop is typically used in connection with standard modem communication, cable modem, Dish networks, ISDN, Digital Subscriber Line (DSL), or various wireless communication methods. The various systems might also reside Within a local area network (LAN) which interfaces to me network via a leased line (T1, D3). Such communication methods are well known in the art, and are covered in a variety of standard texts, such as Gilbert Held, Understanding Data Communications (1996), which is hereby; incorporated by reference.

For brevity, the present invention is illustrated as pertaining to a system of electronic commerce, such as transactions running over the Internet. Many applications of the present invention could be formulated. The system could be used to authenticate users of a computer system, to activate a passcode system, to access a restricted service or network, to access a building or other restricted area, automobile security and access, or any other purpose. The system may also be used to access on-line services, kiosk services, Point of Sale (POS) terminals, Automatic Teller Machines (ATMs), and/or the like.

A user computing unit, another computing system, and/or the like may be interconnected via a second network, such as a payment network. The payment network represents existing proprietary networks that presently accommodate transactions for credit cards, debit cards, and other types of financial/banking cards. The payment network is a closed network that is assumed to be secure from eavesdroppers.

The system may communicate the data to the user using at least one protocol in at least one format. The system may configure the data in a format and communicate the data to the user using a protocol. The system and the user may have a predetermined protocol and format in order to facilitate the communication of the data between them. Exemplary protocols include hyper text transfer protocol (http), secured hyper text transfer protocol (https), file transfer protocol (FTP), secure electronic mail, a network, remote method invocation, distributed component object model, enterprise Java bean, and/or socket communication. The system may be implemented with TCP/IP communications protocols, IPX, Appletalk, IP-6, NetBIOS, OSI or any number of existing or future protocols. Exemplary formats include extensible markup language (XML), name value pair, any custom format, any industry standard format, and/or the like. For a basic introduction of cryptography; please review a text written by Bruce Schneier entitled "Applied Cryptography: Protocols, Algorithms, And Source Code In C," published by John Wiley & Sons (second edition, 1996), which is hereby incorporated by reference. Specific information related to the protocols, standards, and application software used in connection with the Internet may not be discussed herein. For further information regarding such details, see Dilip Naik, Internet Standards And Protocols (1998); Java 2 Complete, various authors, (Sybex 1999); Deborah Ray and Eric Ray, Mastering HTML 4.0 (1997); and Lopshin, TCP/IP Clearly Explained (1997), where all of these texts are hereby incorporated by reference.

Association of certain data may be accomplished through any data association technique known and practiced in the art. The association may be accomplished either manually or automatically. Automatic association techniques include a database search, a database merge, GREP, AGREP, SQL, and/or the like. The association step may be accomplished by a database merge function, such as using a "key field" in data tables. A "key field" partitions the database according to the high-level class of objects defined by the key field. A certain class may be designated as a key field in both the first data table and the second data table, and the two data tables may then be merged on the basis of the class data in the key field. The data corresponding to the key field in each of the merged data tables is preferably the same. However, data tables having similar, though not identical, data in the key fields may also be merged by using AGREP. Also, the association of XML data is done using Document Type Definition (DTD) and schemas.

In the foregoing specification, the invention has been described with reference to specific embodiments. However, it will be appreciated that various modifications and changes can be made without departing from the scope of the present invention. The specification and figures are to be regarded, in an illustrative manner, rather than a restrictive one, and all such modifications are intended to be included within the scope of present invention. For example, the steps recited in any method or process may be executed in any order and are not limited to the order presented in the method or process.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. An appraisal system comprising:
   a collector system configured to gather at least one of data and files associated with a property; and
   a scoring system coupled to the collector system and configured to analyze at least one of the data and files in order to calculate a score associated with the property,
   wherein the score is calculated using at least one of a zone and a market group associated with the property,
   wherein the scoring system calculates the score for each property within the market group and the market group includes a plurality of properties,
   wherein the scoring system generates a value trend line for the market group by calculating the mean average of the scores for the plurality of properties in the market group,
   wherein the scoring system calculates a normalized value of the scores to be within a predetermined amount of the value trend line,
   wherein the scoring system reconciles a plurality of sales in the market group by comparing the scores for a predetermined period of time to the normalized value of the scores for the market group, and
   wherein the scoring system adjusts the value trend line against the normalized value of the scores in order to adjust the score associated with the property.

2. The appraisal system of claim 1 further comprising an appraisal database coupled to at least one of the collector system and the scoring system and configured to receive at least one of data and files from at least one of the collector system and the scoring system in order to generate an appraisal report associated with the property.

3. The appraisal system of claim 1 wherein the scoring system uses at least one of the score and market analysis software to calculate at least one of an appraisal value and an appraisal report associated with the property.

4. The appraisal system of claim 1 wherein at least one of:
a portable communication device in communication with at least one of the collector system and the scoring system collects latitude, longitude, and altitude coordinates of the property via a Global Positioning System; and
a portable communication device in communication with at least one of the collector system and the scoring system generates at least one of a photograph and satellite image of the property via a Global Positioning System, wherein the collector system compares the latitude, longitude, and altitude coordinates of the property that were collected against the photograph and satellite image generated in order to place a verified latitude, longitude, and altitude in the center of the property.

5. The appraisal system of claim 1 wherein at least one of:
the data and files include at least one of a photograph of the property, a parcel number associated with the property, and one or more comparable sales of other properties in the market group of the property;
the data includes at least one of geographic area, type, style, and size range of the property; and
a portable communication device configured to capture an image of the property and record audibly an address for the property to generate an audio clip that is associated with the image, so that the image can be tagged with a related address data field.

6. The appraisal system of claim 1 wherein the zone is defined by at least one of the market group, a community, a neighborhood, a city; one or more zip codes, a county, a state, a region, and a country.

7. The appraisal system of claim 1 wherein at least one of:
the market group is defined by at least one of the zone, one or more attributes of the property, one or more comparable sales of other properties, a subdivision, a community, and a predetermined geographic boundary; and
one or more properties with similar attributes are in the same market group.

8. A method comprising the steps of:
using a collector system, collecting data related to a first property;
using the collector system, creating at least one of a zone and a market group for the first property;
using a scoring system, generating a score associated with the first property based on the data;
wherein the scoring system calculates the score for each property within the market group and the market group includes a plurality of properties,
wherein the scoring system generates a value trend line for the market group by calculating the mean average of the scores for the plurality of properties in the market group,
wherein the scoring system calculates a normalized value of the scores to be within a predetermined amount of the value trend line,
wherein the scoring system reconciles a plurality of sales in the market group by comparing the scores for a predetermined period of time to the normalized value of the scores for the market group, and
wherein the scoring system adjusts the value trend line against the normalized value of the scores in order to adjust the score associated with the property;
using the scoring system, mapping the score to one or more comparable sales of one or more other properties based on at least one of the score, the zone, and the market group; and
using the scoring system, generating an appraisal report for the first property based on at least one of the score, the zone, the market groups, and mapping of the score to one or more comparable sales of one or more other properties.

9. The method of claim 8 further comprising collecting the data in at least one of text, image, audio, and video files.

10. The method of claim 9 further comprising at least one of:
one or more of the files are imported into an appraisal database;
address data fields associated with the files are tagged in the appraisal database;
integrating the files into the appraisal database; and
allowing access to the files in the appraisal database in order to generate an appraisal report.

11. The method of claim 8 further comprising at least one of:
performing quality control of the data;
notifying an appraiser or another entity if there is a quality control error associated with the data;
at least one of formatting and validating the data;
updating an appraisal value of the first property on a timely basis including at least one of daily, monthly, quarterly, and annually; and
allowing access to the data in the appraisal database in order to generate an appraisal report.

12. A method comprising the steps of:
requesting an appraisal of a property via an appraisal system, wherein the appraisal system includes a collector system, an appraisal database, an accounting system, and a scoring system;
using the collector system to search for at least one of data and files related to the property;
searching the appraisal database for at least one of data and files related to the property;
creating an accounting invoice related to the property via the accounting system;
analyzing at least one of the data, files, and accounting invoice via the scoring system to generate at least one of a score, a zone, and a market group;
wherein the scoring system calculates the score for each property within the market group and the market group includes a plurality of properties
wherein the scoring system generates a value trend line for the market group by calculating the mean average of the scores for the plurality of properties in the market group,
wherein the scoring system calculates a normalized value of the scores to be within a predetermined amount of the value trend line,
wherein the scoring system reconciles a plurality of sales in the market group by comparing the scores for a predetermined period of time to the normalized value of the scores for the market group, and
wherein the scoring system adjusts the value trend line against the normalized value of the scores in order to adjust the score associated with the property; and
preparing an appraisal report associated with the property instantly or within a predetermined period of time based on at least one of the score, the zone, and the market group.

13. The method of claim 12 further comprising at least one of:
  wherein the appraisal report includes at least one of an exterior based appraisal, an interior based-appraisal, and a special request appraisal; and
  notifying an appraiser to perform a property or site inspection of the property based on the appraisal report.

14. The method of claim 12 further comprising at least one of:
  accessing the collector system to at least one of add, edit, review, and verify data including photographs associated with the property;
  at least one of viewing, reviewing, adding, editing, and verifying property data including photographs via a portable communication device; and
  accessing the collector system to at least one of add, edit, review, and verify the appraisal report associated with the property.

15. A method comprising the steps of:
  using a collector system, collecting data related to a first property;
  using the collector system, creating at least one of a zone and a market group for the first property based on the data, wherein each zone includes a plurality of market groups and each market group is generated based on at least one of geographic area, type, style, and size range of the first property;
  using a scoring system, generating a score associated with the first property based on at least one of the zone and market group;
  using the scoring system, calculating the score for each property within the market group and the market group includes a plurality of properties,
  using the scoring system, generating a value trend line for the market group by calculating the mean average of the scores for the plurality of properties in the market group,
  using the scoring system, calculating a normalized value of the scores to be within a predetermined amount of the value trend line,
  using the scoring system, reconciling a plurality of sales in the market group by comparing the scores for a predetermined period of time to the normalized value of the scores for the market group, and
  using the scoring system, adjusting the value trend line against the normalized value of the scores in order to adjust the score associated with the property;
  using the scoring system, mapping the score to one or more comparable sales of one or more other properties based on at least one of the score, the zone, and the market group; and
  using the scoring system, generating an appraisal report for the first property based on at least one of the score, the zone, the market group, and mapping of the score to one or more comparable sales of one or more other properties.

16. The method of claim 15 further comprising mapping the score to one or more comparable sales of one or more other properties includes mapping the score to a cash value of one or more other properties based on at least one of the score, the zone, and the market group.

17. The method of claim 15 further comprising mapping the score to one or more comparable sales of one or more other properties includes mapping the score to a current market value of one or more other properties based on at least one of the score, the zone, and the market group.

18. A system, comprising:
  a host system including a processor for processing data associated with a property;
  a memory in communication with the processor for storing the data;
  an input digitizer in communication with the memory and the processor for inputting the data into the memory; and
  an application program stored in the memory and accessible by the processor for directing processing of the data by the processor, wherein the application program is configured to facilitate the steps of:
  collecting data related to a first property;
  creating at least one of a zone and a market group for the first property;
  generating a score associated with the first property based on the data;
  calculating the score for each property within the market group and the market group includes a plurality of properties,
  generating a value trend line for the market group by calculating the mean average of the scores for the plurality of properties in the market group,
  calculating a normalized value of the scores to be within a predetermined amount of the value trend line,
  reconciling a plurality of sales in the market group by comparing the scores for a predetermined period of time to the normalized value of the scores for the market group, and
  adjusting the value trend line against the normalized value of the scores in order to adjust the score associated with the property;
  mapping the score to one or more comparable sales of one or more other properties based on at least one of the score, the zone, and the market group; and
  generating an appraisal report for the first property based on at least one of the score, the zone, the market group, and mapping of the score to one or more comparable sales of one or more other properties.

19. A system, comprising:
  a host server for accepting and processing data in connection with a property;
  an appraisal database in communication with the host server for collecting data on the property and using a collector system of the host server to gather at least one of data and files associated with the property; and
  a scoring system in communication with at least one of the host server, the collector system, and the appraisal database configured to analyze at least one of the data and files in order to calculate a score associated with the property, wherein the score is calculated using at least one of a zone and a market group associated with the property
  wherein the scoring system calculates the score for each property within the market group and the market group includes a plurality of properties,
  wherein the scoring system generates a value trend line for the market group by calculating the mean average of the scores for the plurality of properties in the market group,
  wherein the scoring system calculates a normalized value of the scores to be within a predetermined amount of the value trend line,
  wherein the scoring system reconciles a plurality of sales in the market group by comparing the scores for a predetermined period of time to the normalized value of the scores for the market group, and wherein the scoring system adjusts the value trend line against the normalized value of the scores in order to adjust the score associated with the property.

20. A system, comprising:

a browser for submitting data to a web server, wherein the browser and the web server communicate via a communication channel and the data submitted to the web server includes information in connection with at least a first property;

a collector system associated with the web server for collecting data related to the first property;

an appraisal database associated with the web server and in communication with the collector system for collecting data on the first property; and a scoring system associated with the web server and in communication with at least one of the collector system and the appraisal database for creating at least one of a zone and a market group for the first property, generating a score associated with the first property based on the data, mapping the score to one or more comparable sales of one or more other properties based on at least one of the score, the zone, and the market group, and generating an appraisal report for the first property based on at least one of the score, the zone, the market group, and mapping of the score to one or more comparable sales of one or more other properties wherein the scoring system calculates the score for each property within the market group and the market group includes a plurality of properties, wherein the scoring system generates a value trend line for the market group by calculating the mean average of the scores for the plurality of properties in the market group, wherein the scoring system calculates a normalized value of the scores to be within a predetermined amount of the value trend line, wherein the scoring system reconciles a plurality of sales in the market group by comparing the scores for a predetermined period of time to the normalized value of the scores for the market group, and wherein the scoring system adjusts the value trend line against the normalized value of the scores in order to adjust the score associated with the property.

\* \* \* \* \*